United States Patent
Tsutsui et al.

(10) Patent No.: US 7,267,097 B2
(45) Date of Patent: Sep. 11, 2007

(54) FUEL INJECTION SYSTEM OF INTERNAL COMBUSTION ENGINE

(75) Inventors: Tsuneo Tsutsui, Gotenba (JP); Takafumi Yamada, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 89 days.

(21) Appl. No.: 10/569,132

(22) PCT Filed: Aug. 30, 2004

(86) PCT No.: PCT/JP2004/012867

§ 371 (c)(1),
(2), (4) Date: Feb. 22, 2006

(87) PCT Pub. No.: WO2005/021953

PCT Pub. Date: Mar. 10, 2005

(65) Prior Publication Data

US 2006/0283425 A1 Dec. 21, 2006

(30) Foreign Application Priority Data

Sep. 1, 2003 (JP) ............................. 2003-309271

(51) Int. Cl.
*F02B 3/00* (2006.01)
*F02B 3/04* (2006.01)

(52) U.S. Cl. ...................................... 123/299; 123/478

(58) Field of Classification Search ................ 123/299, 123/300, 446, 467, 478, 447; 701/104
See application file for complete search history.

(56) References Cited

U.S. PATENT DOCUMENTS

| 6,088,647 | A | 7/2000 | Hemberger et al. |
| 6,311,669 | B1 | 11/2001 | Przymusinski et al. |
| 7,195,002 | B2* | 3/2007 | Tsutsui ...................... 123/467 |
| 2003/0029415 | A1 | 2/2003 | Pfaeffle et al. |
| 2003/0234007 | A1 | 12/2003 | Hokazono et al. |
| 2006/0130812 | A1* | 6/2006 | Tsutsui ...................... 123/446 |

FOREIGN PATENT DOCUMENTS

| DE | 199 37 148 A1 | 2/2001 |
| JP | A 06-101552 | 4/1994 |
| JP | A 2000-018074 | 1/2000 |
| JP | A 2001-164976 | 6/2001 |

* cited by examiner

*Primary Examiner*—Mahmoud Gimie
(74) *Attorney, Agent, or Firm*—Oliff & Berridge, PLC

(57) ABSTRACT

An internal combustion engine provided with a common rail (13) and fuel injectors (3) connected to the common rail (13). When pilot injection is performed, the injection pressure pulsates. At this time, the injection amount of the main injection fluctuates by a certain fluctuation pattern. If indicating on an abscissa a time interval from when pilot injection is started to when main injection is started and indicating on the ordinate a fluctuation amount of main injection, the fluctuation pattern of the injection amount of the main injection becomes a form contracted or expanded in the abscissa direction and ordinate direction in accordance with the rail pressure. This characteristic is utilized to find the fluctuation amount of the injection amount of the main injection.

10 Claims, 18 Drawing Sheets

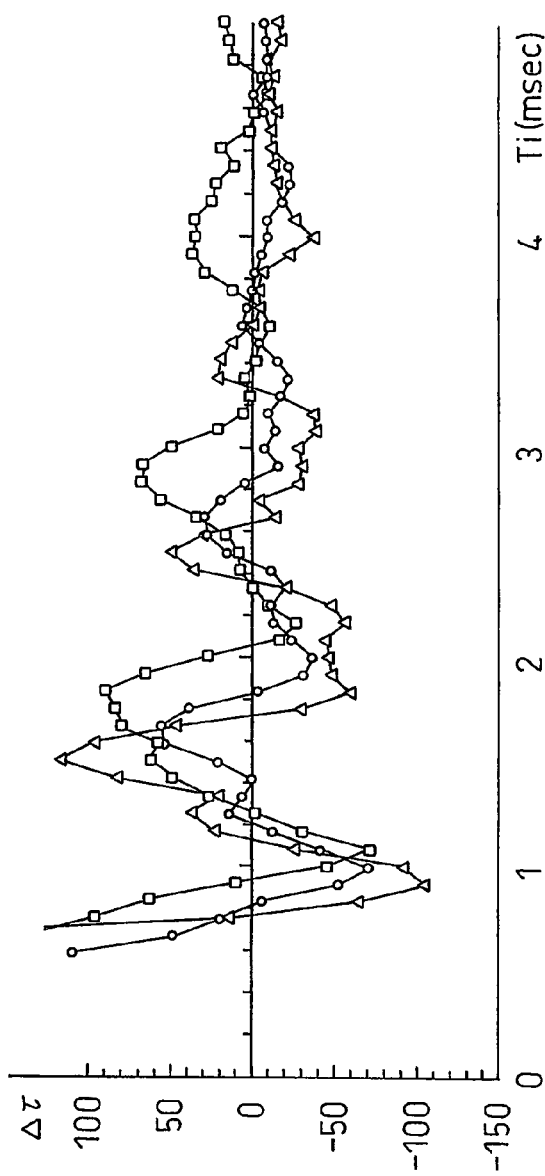
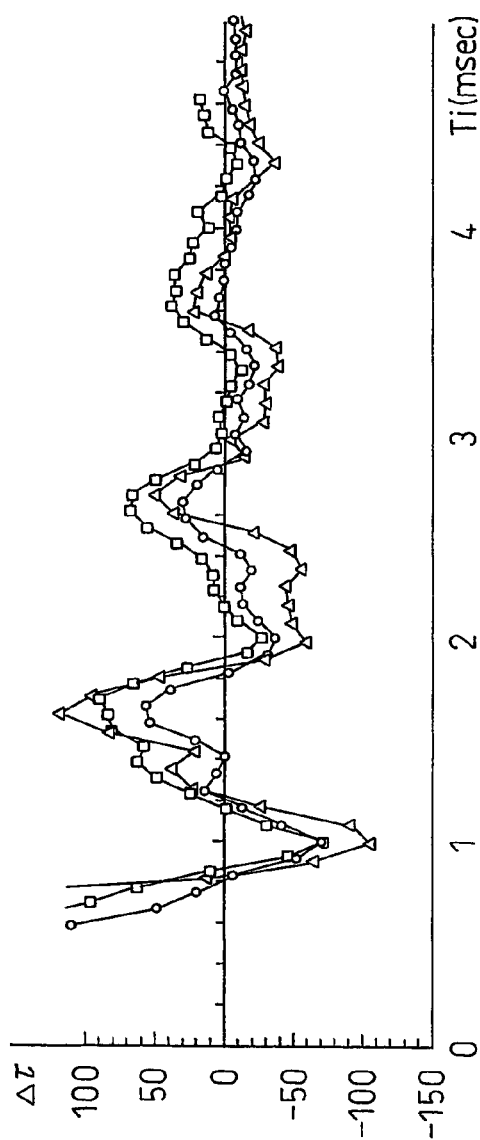
Fig.11A
Fig.11B

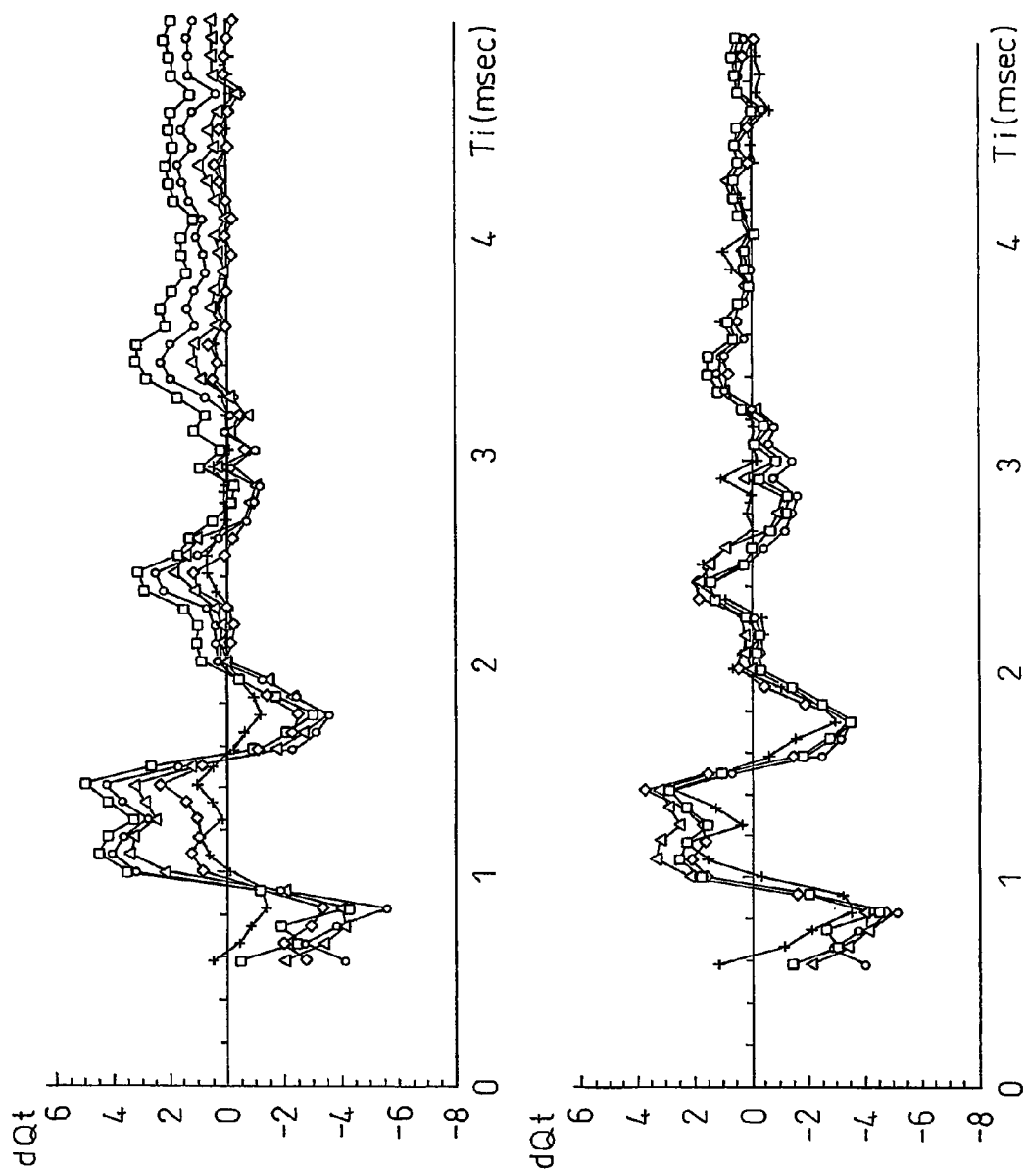

FUEL INJECTION SYSTEM OF INTERNAL COMBUSTION ENGINE

TECHNICAL FIELD

The present invention relates to a fuel injection system of an internal combustion engine.

BACKGROUND ART

An internal combustion engine designed so that the nozzle chambers of fuel injectors are connected to a common rail through high pressure lines and performing two fuel injections, for example a pilot injection and a succeeding main injection, is known (for example, see Japanese Unexamined Patent Publication (Kokai) No. 2000-18074).

When using such a common rail, however, when fuel injection is performed, the pressure wave generated in a nozzle chamber of a fuel injector at that time propagates through the high pressure line and reaches the common rail. Next, this pressure wave proceeds in the high pressure rail toward the nozzle chamber. This causes violent pulsation of the fuel pressure in the nozzle chamber.

In this conventional internal combustion engine, the main injection is performed after the pilot injection when this violent pulsation of the fuel pressure occurs in the nozzle chamber due to the reflected wave in the common rail. If performing the main injection when the fuel pressure in the nozzle chamber violently pulsates in this way, however, the problem arises that the injection amount of the main injection greatly fluctuates and ends up greatly deviating from the normal amount.

DISCLOSURE OF INVENTION

An object of the present invention is to provide a fuel injection system of an internal combustion engine able to accurately control the injection amount to the target value even when using a common rail.

According to the present invention, there is provided a fuel injection system of an internal combustion engine provided with a common rail and fuel injectors connected to the common rail, performing fuel injection from each fuel injector at least the two times of prior injection and later injection during one cycle of the engine, and changing in fluctuation amount of the later injection with respect to a target value depending on a time interval from when the prior injection is performed to when the later injection is performed, the fuel injection system of an internal combustion engine provided with a storage device for storing a reference fluctuation amount of the later injection changing along with a reference fluctuation pattern along with an increase in the time interval when the rail pressure is a predetermined reference rail pressure and storing a contraction rate or expansion rate of the fluctuation pattern when contracting or expanding the fluctuation pattern of the fluctuation amount of the later injection when the rail pressure is not the reference rail pressure to overlay it on the reference fluctuation pattern, a calculation device for using the contraction rate or expansion rate to calculate the fluctuation amount of the later injection in accordance with the rail pressure from the reference fluctuation amount and time interval, and a control device for using the fluctuation amount calculated by the calculation device to control an injection amount to a target value.

BRIEF DESCRIPTION OF DRAWINGS

FIGS. 11A to 11C are views of fluctuation amounts of valve opening timing of a needle valve;

FIGS. 12A and 12B are views of fluctuation amounts of main injection;

BEST MODE FOR CARRYING OUT THE INVENTION

Figure 1:
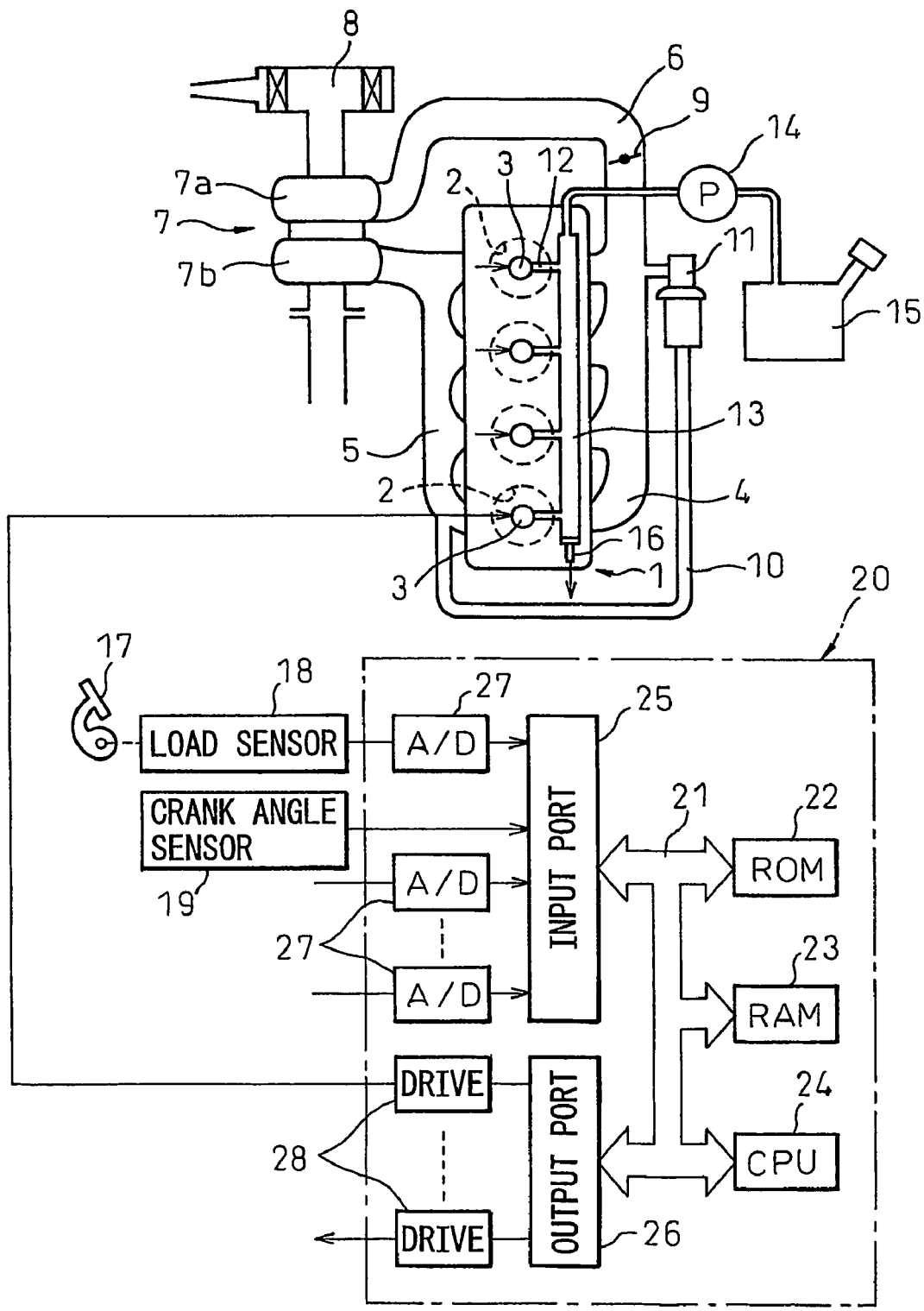
FIG. 1 is an overview of a compression ignition type internal combustion engine.

Referring to FIG. 1, 1 is a compression ignition type internal combustion engine body, 2 a combustion chamber of a cylinder, 3 a fuel injector for injecting fuel into a combustion chamber 2, 4 an intake manifold, and 5 an exhaust manifold. The intake manifold 4 is connected through an intake duct 6 to an outlet of a compressor 7a of an exhaust turbocharger 7. The inlet of the compressor 7a is connected to an air cleaner 8. The intake duct 6 has arranged inside it a throttle valve 9 driven by a step motor. On the other hand, the exhaust manifold 5 is connected to an inlet of an exhaust turbine 7b of the exhaust turbocharger 7.

The exhaust manifold 5 and the intake manifold 4 are connected to each other through an exhaust gas recirculation (hereinafter referred to as an "EGR") passage 10. The EGR passage 10 has an electronic control type EGR control valve 11 arranged in it. On the other hand, each fuel injector 3 is connected through a fuel feed line 12 to a common rail 13. The common rail 13 is supplied inside it with fuel from a fuel tank 15 by an electronic control type variable discharge fuel pump 14. The fuel supplied to the common rail 13 is supplied through the fuel feed lines 12 to the fuel injectors 3. The common rail 13 is provided with a fuel pressure sensor 16 for detecting the fuel pressure in the common rail 13. Based on the output signal of the fuel pressure sensor 16, the discharge of the fuel pump 14 is controlled so that the fuel pressure in the common rail 16 becomes the target fuel pressure.

An electronic control unit 20 is comprised of a digital computer and is provided with a ROM (read only memory) 22, RAM (random access memory) 23, CPU (microprocessor) 24, input port 25, and output port 26 all connected by a bidirectional bus 21. The output signal of the fuel pressure sensor 16 is input through a corresponding AD converter 27 to the input port 25. On the other hand, an accelerator pedal 17 has a load sensor 18 connected to it to generate an output voltage proportional to the depression L of the accelerator pedal 17. The output voltage of the load sensor 18 is input through the corresponding AD converter 27 to the input port 25. Further, the input port 25 has a crank angle sensor 19 connected to it for generating an output pulse every time a crankshaft rotates by for example 15°. On the other hand, the output port 26 has connected to it the fuel injectors 3, a step motor for driving the throttle valve 9, the EGR control valve 11, and the fuel pump 14 through corresponding drive circuits 28.

Figure 2:
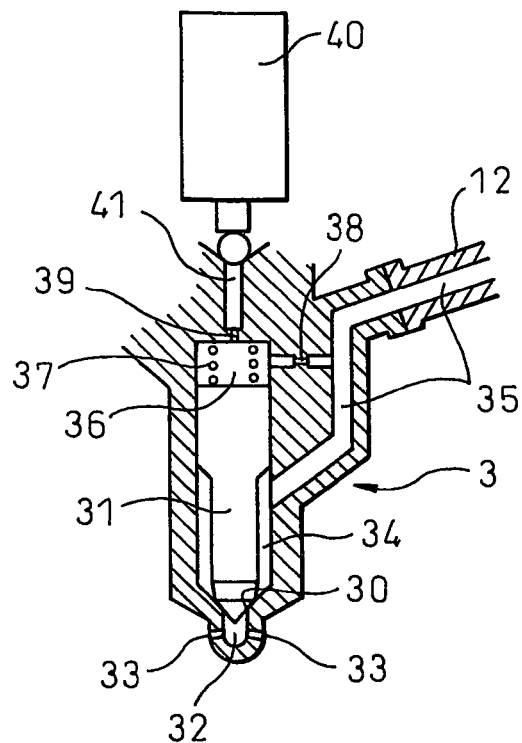
FIG. 2 is a side sectional view of a tip of a fuel injector.

FIG. 2 is an enlarged view of a fuel injector 3. As shown in FIG. 2, the fuel injector 3 is provided with a needle valve 31 able to sit on a valve seat 30, a suck chamber 32 formed around a tip of the needle valve 31, an injection port 33 extending from the suck chamber 32 to the inside of the combustion chamber 2, and a nozzle chamber 34 formed around the needle valve 31. The nozzle chamber 34 is connected to the common rail 13 through a high pressure fuel feed passage extending through the inside of the body of the fuel injector 3 and the inside of the fuel feed line 12, that is, the "high pressure line 35". The high pressure fuel in the common rail 13 is supplied through the high pressure line 35 to the inside of the nozzle chamber 34.

The fuel injector is formed inside it with a pressure control chamber 36 facing the back surface of the needle valve 31. The pressure control chamber 36 is provided inside it with a compression spring 37 pressing the needle valve 31 toward the valve seat 30. The pressure control chamber 36 is connected on the one hand through an inlet side constriction 38 to the middle of the high pressure line 35 and on the other hand through an outlet side constriction 39 to a fuel overflow port 41 controlled to open and close by an overflow control valve 40. The pressure control chamber 36 is continuously supplied with high pressure fuel through the constriction 38. Therefore, the pressure control chamber 36 is filled with fuel.

When the fuel overflow port 41 is closed by the overflow control valve 40, as shown in FIG. 2, the needle valve 31 sits on the valve seat 30. Therefore, the fuel injection is stopped. At this time, the nozzle chamber 34 and the pressure control chamber 36 become the same fuel pressure. When the overflow control valve 40 opens, that is, it opens the fuel overflow port 41, the high pressure fuel in the pressure control chamber 36 flows out through a constriction 39 from the fuel overflow port 41 and therefore the pressure in the pressure control chamber 36 gradually flows. When the pressure in the pressure control chamber 36 falls, the needle valve 31 rises and the injection of the fuel from the injection port 33 is started.

That is, the pressure control chamber 36 and the fuel overflow port 41 are provided between them with a constriction 39. Further, due to other delay elements, the injection of fuel is started a little while after the overflow control valve 40 opens. Next, when the overflow control valve 40 closes, that is, it closes the fuel overflow port 41, the fuel supplied through the constriction 38 to the inside of the pressure control chamber 36 causes the pressure in the pressure control chamber 36 to gradually increase and therefore the fuel injection is stopped a little while after the overflow control valve 40 closes.

Figure 3A:
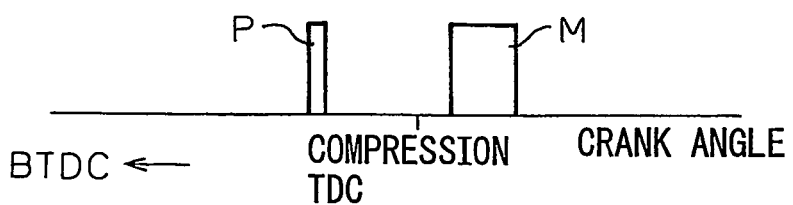
FIGS. 3A and 3B are views of injection patterns.
Figure 3B:
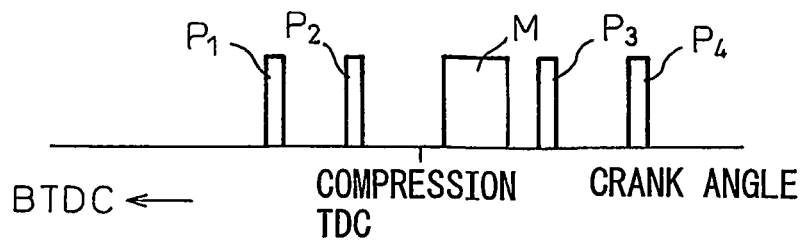

In the present invention, fuel is injected from each fuel injector at least two times, a prior injection and a later injection, during one cycle of the engine. FIGS. 3A and 3B show two representative fuel injection methods. FIG. 3A shows the case of performing a pilot injection P before a main injection M. In this case, the pilot injection P is the prior injection and the main injection M is the later injection.

On the other hand, FIG. 3B shows the case of performing a plurality of pilot injections $P_1$, $P_2$ before the main injection M and performing a plurality of post injections $P_3$ $P_4$ after the main injection M. In this case, if making the pilot injection $P_2$ the later injection, the pilot injection $P_1$ becomes the prior injection. If making the main injection M the later injection, the pilot injections $P_1$, $P_2$ become the prior injections. If making the pilot injection $P_3$ the later injection, the pilot injections $P_1$, $P_2$ and the main injection M become the prior injections.

Note that the present invention will be explained taking as an example the case of performing the pilot injection P before the main injection M as shown in FIG. 3A.

Figure 4A:
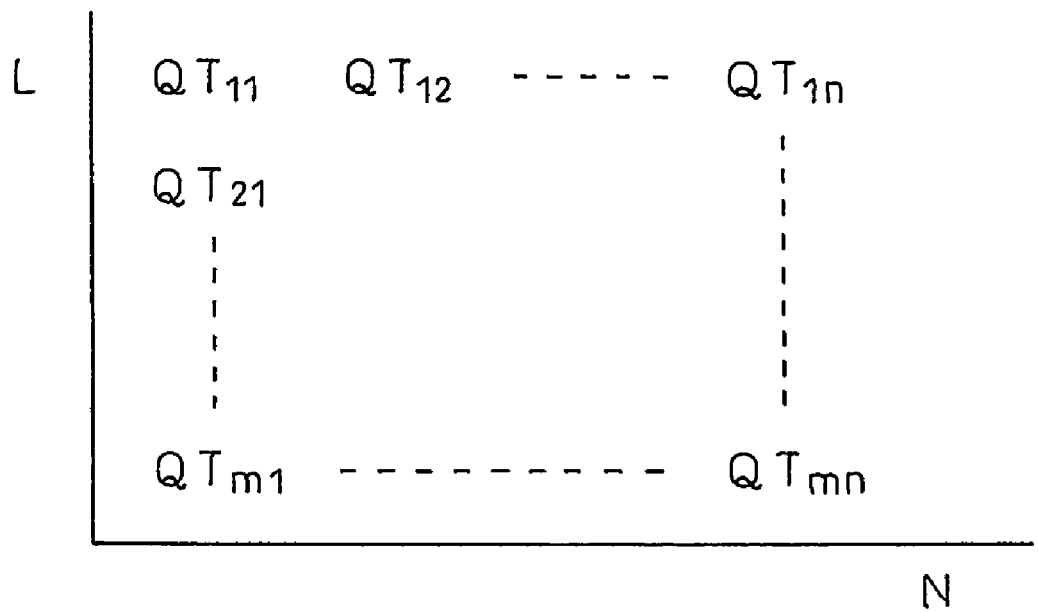
FIGS. 4A and 4B are views of maps of injection amounts.
Figure 4B:
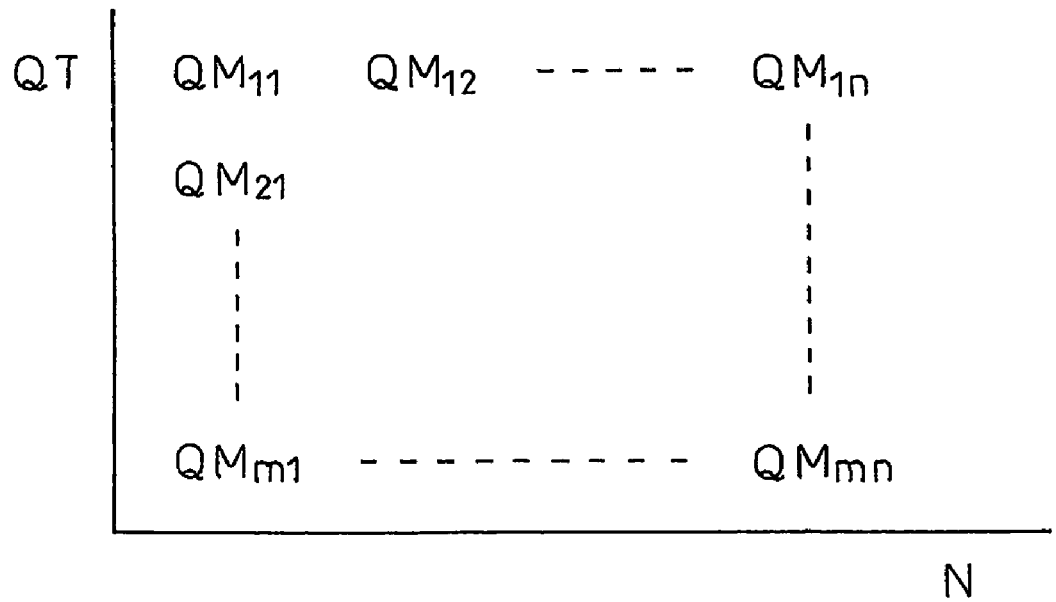

In the embodiment of the present invention, the target total injection amount QT is stored in advance in the ROM 22 in the form of a map as a function of the depression of the accelerator pedal 17, that is, the accelerator opening degree L, and the engine speed N as shown in FIG. 4A. Further, the target main injection amount QM is stored in advance in the ROM 22 in the form of a map as a function of the total injection amount QT and the engine speed N as shown in FIG. 4B. On the other hand, the target pilot injection amount QP is obtained by subtracting from the total injection amount QT the main injection amount QM.

Figure 5A:
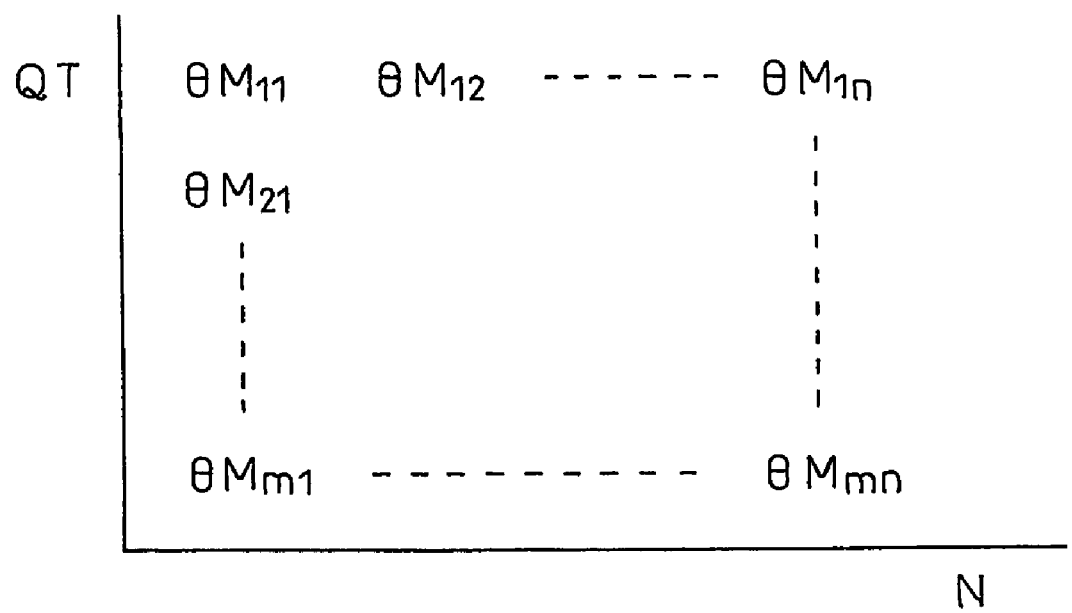
FIGS. 5A and 5B are views of maps of main injection timing etc.
Figure 5B:
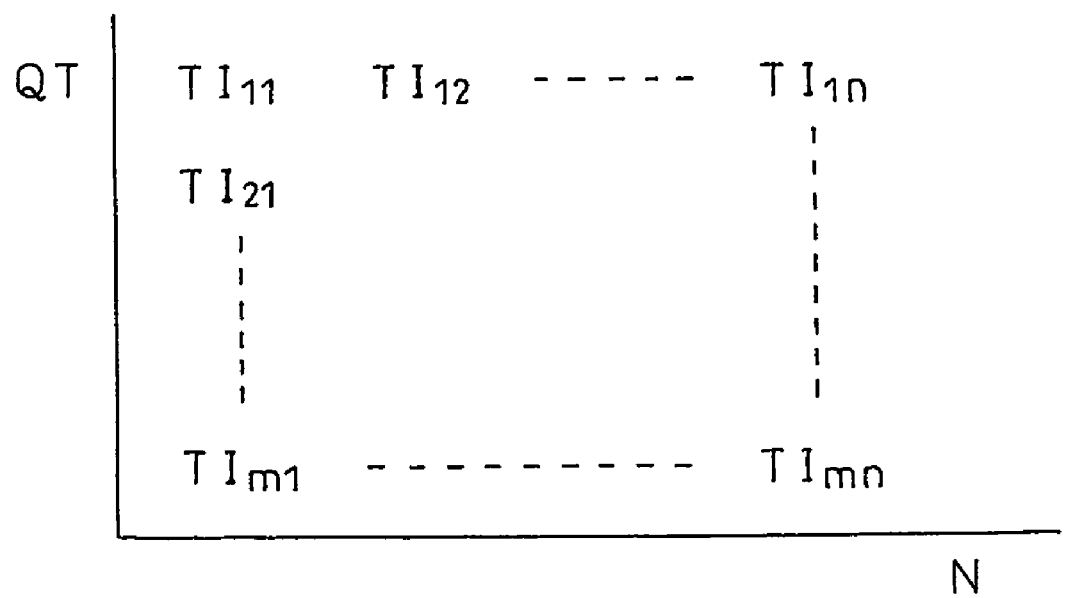

Further, the injection start timing θM of the main injection M is stored in advance in the ROM 22 in the form of a map as a function of the total injection amount QT and the engine speed N as shown in FIG. 5A. Further, the time interval from when the prior injection is performed to when the later injection is performed is set in advance. In this embodiment of the present invention, the time interval TI from when the pilot injection P is started to when the main injection M is started is stored in advance in the ROM 22 in the form of a map as a function of the total injection amount QT and the engine speed N as shown in FIG. 5B. The injection start timing OP of the pilot injection P is calculated from the injection start timing θM of the main injection M and the time interval TI.

Further, in this embodiment of the present invention, the target rail pressure in the common rail 13 is set in advance. This target rail pressure generally speaking becomes higher the greater the total injection amount QT.

Now, when the needle valve 31 opens and the fuel injection is started in FIG. 2, the pressure in the nozzle chamber 34 rapidly drops. If the pressure in the nozzle chamber 34 rapidly drops in this way, a pressure wave is produced. This pressure wave propagates through the inside of the high pressure line 35 toward the common rail 13. Next, this pressure wave is reflected at the open end of the high pressure line 35 leading toward the inside of the common rail 13. Next, this pressure wave proceeds through the high pressure line 35 toward the nozzle chamber 34 in the state with the pressure inverted with respect to the mean pressure, that is, in the form of a high pressure wave, and causes the nozzle chamber 34 to become high in pressure temporarily. For example, if pilot injection has been performed, for a little while after that, the inside of the nozzle chamber 34 becomes temporarily a high pressure due to the reflected wave in the common rail 13.

On the other hand, when the needle valve 31 closes, the flow of the fuel is rapidly blocked, so the pressure inside the nozzle chamber 34 temporarily rises and a pressure wave is formed. This pressure wave also propagates through the inside of the high pressure line 35, is reflected at the common rail 13, and returns to the inside of the nozzle chamber 34.

Further, the opening and closing operation of the overflow control valve 40 also causes generation of a pressure wave propagated through the inside of the nozzle chamber 34. That is, if the overflow control valve 40 opens, the pressure at the fuel overflow port 41 rapidly falls, so a pressure wave is generated. If the overflow control valve 40 closes, the pressure of the fuel overflow port 41 rapidly rises, so a pressure wave is generated. These pressure waves pass through the pair of constrictions 39, 38 to be propagated through the nozzle chamber 34 and cause the pressure in the nozzle chamber 34 to rise or fall. Simultaneously, the pressure waves are reflected in the nozzle chamber 34 and are propagated toward the common rail 13 or the fuel overflow port 41.

In this way, if pilot injection P is performed, the pressure waves generated due to the opening and closing operation of the needle valve 31 and the opening and closing operation of the overflow control valve 40 cause the fuel pressure in the nozzle chamber 34 to pulsate. Next, main injection M is performed when the fuel pressure in the nozzle chamber 34 is pulsating in this way. However, if main injection M is performed when the fuel pressure in the nozzle chamber 34 is pulsating in this way, the injection amount will increase when the fuel pressure in the nozzle chamber 34 becomes higher and the injection amount will decrease when the fuel pressure in the nozzle chamber 34 becomes lower, so the injection amount of the main injection M will fluctuate.

Figure 6A:
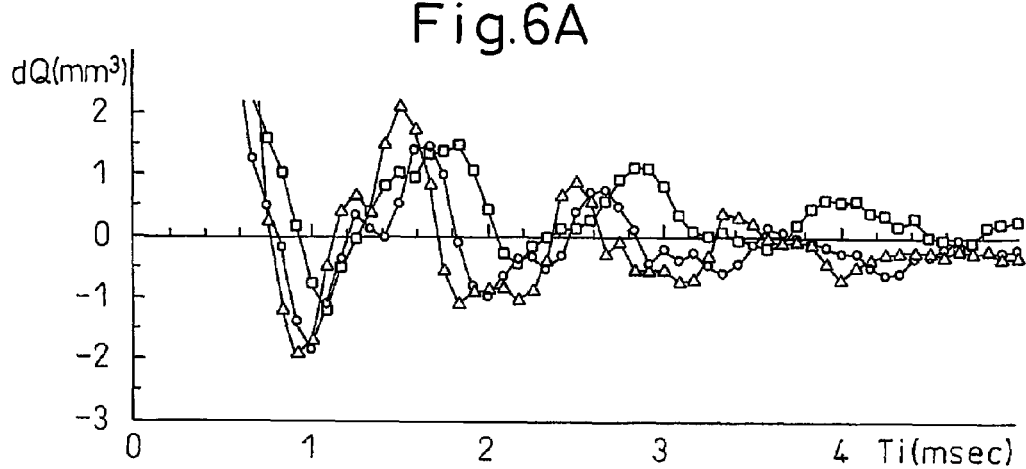
FIGS. 6A to 6C are views of fluctuation amounts of main injection.
Figure 6B:
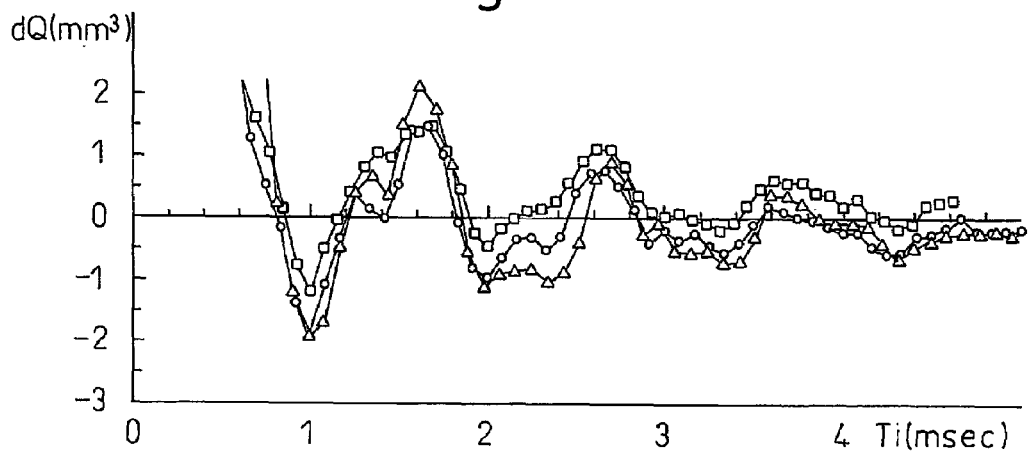

Next, the fluctuation amount of the injection amount of the main injection M will be explained with reference to FIGS. 6A to 6B and FIGS. 7A to 7C. In FIGS. 6A to 6B and FIGS. 7A to 7C, the abscissa Ti shows the time interval (msec) from when the pilot injection P was started to when the main injection M is started, while the ordinate dQ shows the fluctuation amount ($mm^3$) of the injection amount of the main injection M with respect to the target value. In FIGS. 6A to 6B and FIGS. 7A to 7C, the □ marks show when the rail pressure is 48 MPa, the o marks show when the rail pressure is 80 MPa, and the Δ marks show when the rail pressure is 128 MPa. Note that FIG. 6A to FIG. 6C show when the main injection amount is small, while FIGS. 7A to 7C show when the main injection amount is large.

Figure 6C:
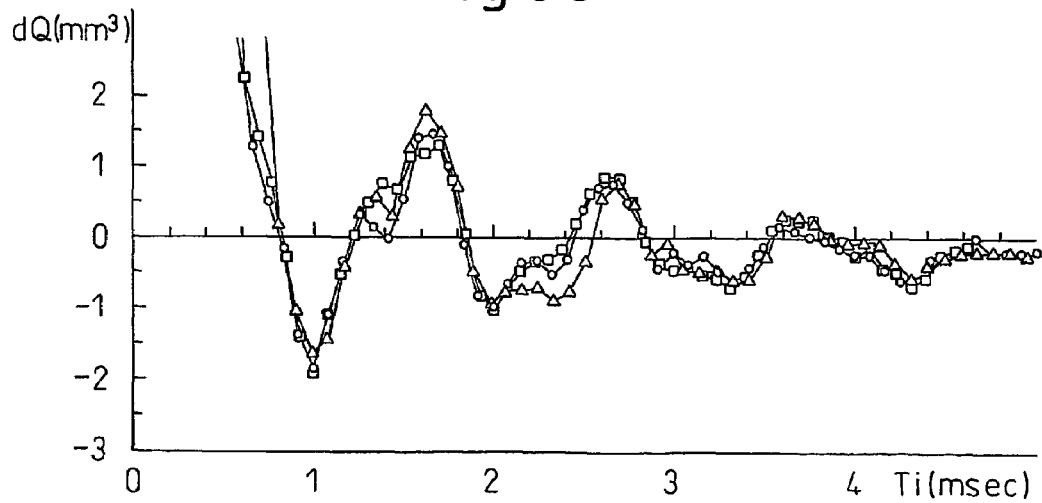
Figure 7A:
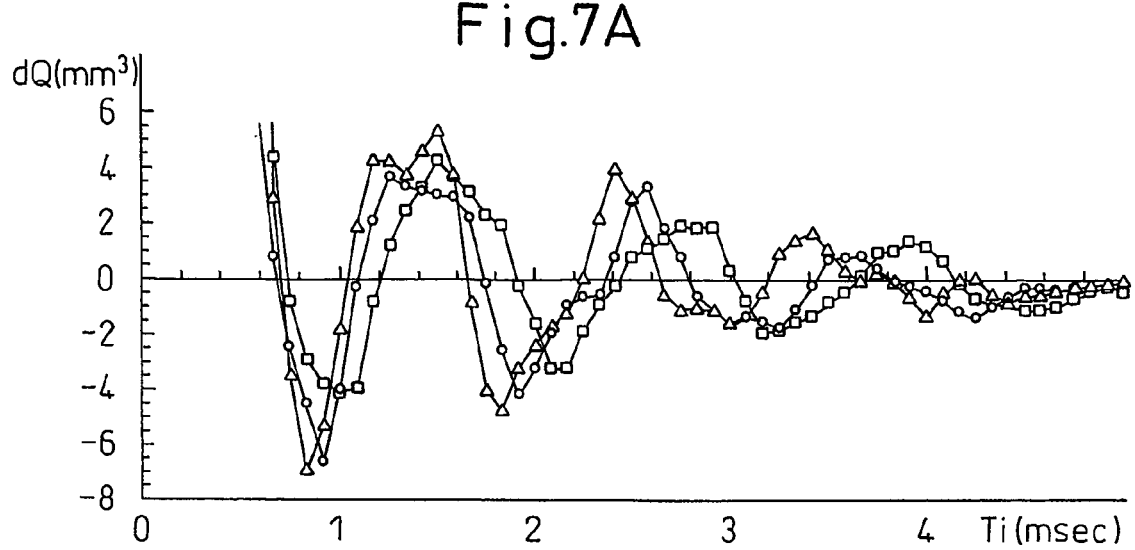
FIGS. 7A to 7C are views of fluctuation amounts of main injection.
Figure 7B:
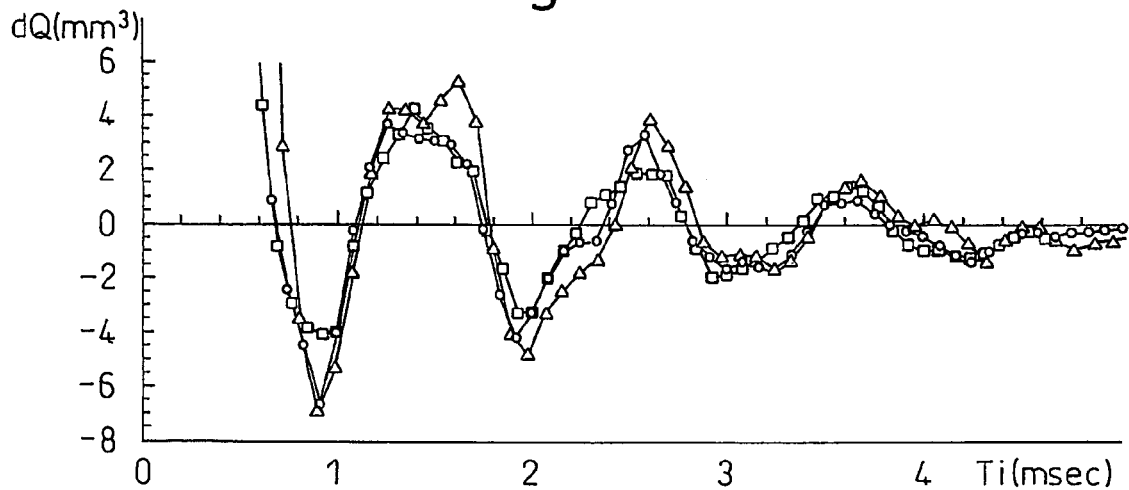
Figure 7C:
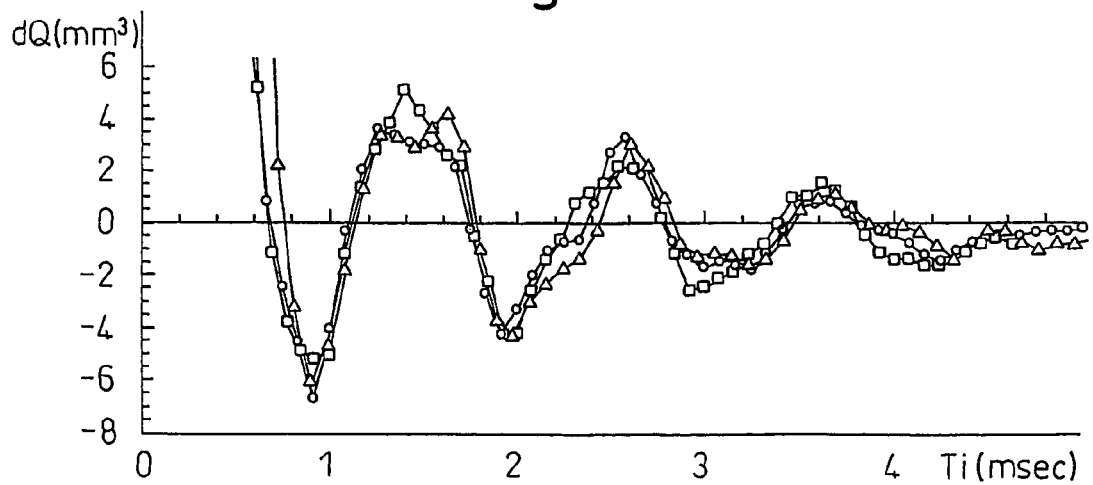

Specifically, FIGS. 6A to 6C show when the pilot injection amount is 2 ($mm^3$) and the main injection amount is 2 ($mm^3$), while FIGS. 7A to 7C show when the pilot injection amount is 2 ($mm^3$) and the main injection amount is 20 ($mm^3$).

Now, FIG. 6A and FIG. 7A show the actual fluctuation amount dQ of the injection amount of the main injection M with respect to the target value for three different rail pressures. As explained above, if the fuel pressure in the nozzle chamber 34 becomes higher, the main injection amount increases, while if the fuel pressure in the nozzle chamber 34 becomes lower, the main injection amount decreases, so it is learned from FIG. 6A and FIG. 7A that after the pilot injection, the fuel pressure in the nozzle chamber 34 repeatedly rises and falls, that is, pulsates.

However, looking at FIG. 6A and FIG. 7A, it will be understood that the fluctuation patterns of the main injection amounts expressed by the curves differ in period, that is, the higher the rail pressure, the shorter the period, but rise and fall by similar forms. As explained above, the fuel pressure in the nozzle chamber 34 fluctuates due to the pressure wave propagated between the nozzle chamber 34 and common rail 13 or between the nozzle chamber 34 and the fuel overflow port 41. The distance between the nozzle chamber 34 and the common rail 13 is a fixed length and the distance between the nozzle chamber 34 and fuel overflow port 41 is also a fixed length, so if the propagation speed of the pressure wave is constant, the fuel pressure generated in the nozzle chamber 34 after the pilot injection P is performed will pulsate by a set fluctuation pattern.

However, the propagation speed of a pressure wave changes depending on the fuel pressure and fuel temperature. That is, the propagation speed of the pressure wave is expressed by the square root of $(E/\gamma) \cdot g$ where E is the volume elasticity, $\gamma$ is the density of the fuel, and g is the acceleration of gravity. That is, the propagation speed of the pressure wave is proportional to the square root of the volume elasticity E. However, the volume elasticity E is proportional to the fuel pressure and inversely proportional to the fuel temperature. Therefore, the propagation speed of the pressure wave becomes faster the higher the fuel pressure and becomes slower the higher the fuel temperature. That is, the propagation speed of the pressure wave becomes faster the higher the rail pressure.

Therefore, when the rail pressure becomes higher, the period of fluctuation of the fuel pressure in the nozzle chamber 34 becomes shorter. At this time, the fuel pressure in the nozzle chamber 34 fluctuates in a form with the fluctuation pattern contracted in the abscissa direction in FIG. 6A and FIG. 7A, that is, in the time interval axis direction. Therefore, as shown in FIG. 6A and FIG. 7A, the higher the rail pressure, the more the injection amount dQ of the main injection fluctuates in a form with the fluctuation pattern contracted in the time interval axis direction.

If making the rail pressure 80 MPa shown by the o marks in FIG. 6A and FIG. 7A the reference rail pressure and making the fluctuation pattern of the fluctuation amount dQ of the main injection at the time of this reference rail pressure the reference fluctuation pattern, at the time of the rail pressure 48 MPa shown by the □ marks, that is, when the rail pressure is lower than the reference rail pressure, if the overall fluctuation pattern of the fluctuation amount dQ of the main injection is uniformly contracted in the time interval axis direction using the time interval Ti=0 as the fixed point, the timing of upward and downward fluctuation of the fluctuation pattern will match the timing of upward and downward fluctuation of the reference fluctuation pattern. At the time of the rail pressure 128 MPa shown by the Δ marks, that is, when the rail pressure is higher than the reference rail pressure, if the overall fluctuation pattern of the fluctuation amount dQ of the main injection is uniformly expanded in the time interval axis direction using the time interval Ti=0 as the fixed point, the timing of upward and downward fluctuation of the fluctuation pattern will match the timing of upward and downward fluctuation of the reference fluctuation pattern. FIG. 6B and FIG. 7B show the case when making the fluctuation pattern contract when the rail pressure is 48 MPa and making the fluctuation pattern expand when the rail pressure is 128 MPa so that the period of upward and downward fluctuation of the fluctuation pattern matches the period of upward and downward fluctuation of the reference fluctuation pattern in this way.

When the main injection amount is small as shown in FIG. 6B, the rate of the deviation between the reference fluctuation pattern and the contracted or expanded other fluctuation patterns is great, while when the main injection amount is large as shown in FIG. 7B, the rate of the deviation between the reference fluctuation pattern and the contracted or expanded other fluctuation patterns becomes considerably small. Therefore, when the main injection amount is great as shown in FIG. 7B, if making the fluctuation pattern at each rail pressure contract or expand, it is possible to overlay each fluctuation pattern on the reference fluctuation pattern. That is, it becomes possible to standardize each fluctuation pattern to a common reference fluctuation pattern.

When it is possible to standardize each fluctuation pattern to a common fluctuation pattern in this way, it is possible to modify the time interval by the contraction rate or expansion rate of each fluctuation pattern and use the modified time interval to find the fluctuation amount dQ of the main injection at each rail pressure from the common reference fluctuation pattern.

For example, if making the fluctuation pattern of the fluctuation amount dQ of the main injection when the rail pressure is 80 MPa in FIG. 7A the common reference fluctuation pattern, the fluctuation amount dQ of the main injection at each time interval Ti when the rail pressure is 48 MPa matches with the reference fluctuation amount dQ of the main injection at the reference fluctuation pattern when contracting the time interval Ti by the contraction rate of the fluctuation pattern at the time of 48 MPa. That is, the contraction rate or expansion rate of the fluctuation pattern at each rail pressure is multiplied with the time interval Ti to obtain the modified time interval. The reference fluctuation amount dQ at the reference fluctuation pattern in accordance with that modified time interval matches with the fluctuation amount dQ of the main injection at each rail pressure. If using the modified time interval in this way, if storing only the reference fluctuation amount dQ of the main injection at the reference fluctuation pattern, it is possible to find the fluctuation amount dQ of the main injection at each rail pressure from this reference fluctuation amount dQ.

That is, in the present invention, the reference fluctuation amount of the later injection, changing along with the reference fluctuation pattern along with an increase in the time interval Ti when the rail pressure is a predetermined reference rail pressure, is stored in advance. Further, the contraction rate or expansion rate of the fluctuation pattern when contracting or expanding the fluctuation pattern of the fluctuation amount of the later injection to overlay it on the reference fluctuation pattern when the rail pressure is not the reference rail pressure is stored in advance. Using the contraction rate or expansion rate, the fluctuation amount of the later injection in accordance with the rail pressure is calculated from the reference fluctuation amount and time interval Ti.

Specifically speaking, the reference fluctuation amount dQ of the later injection at the reference rail pressure is stored in advance as a function of the time interval Ti. The contraction rate or expansion rate of each fluctuation pattern when overlaying the fluctuation pattern at a representative rail pressure on the reference fluctuation pattern is stored in advance. By multiplying the contraction rate or expansion rate of the fluctuation pattern at the current rail pressure with the time interval Ti, the modified time interval is found. The reference fluctuation amount dQ of the later injection in accordance with this modified time interval is made the fluctuation amount of the later injection at the current rail pressure.

Next, various embodiments based on this basic thinking of the present invention will be successively explained.

As shown in FIG. 6B and FIG. 7B, the fluctuation amount dQ of the main injection at the same time interval Ti becomes greater the higher the rail pressure. Therefore, to standardize the fluctuation pattern at each rail pressure to the common reference fluctuation pattern, it is preferable to contract or expand the fluctuation pattern at each rail pressure in accordance with the rail pressure in the ordinate direction of FIG. 6B and FIG. 7B, that is, in the direction increasing or decreasing the fluctuation amount dQ of the main injection. FIG. 6C and FIG. 7C show the case of contracting or expanding the fluctuation pattern at each rail pressure in the direction increasing or decreasing the fluctuation amount dQ of the main injection to overlay it on the reference fluctuation pattern.

In this embodiment of the present invention, the contraction rate or expansion rate of the fluctuation pattern when contracting or expanding the fluctuation pattern of the fluctuation amount of the later injection to overlay it on the reference fluctuation pattern is stored for each rail pressure. In FIG. 6B and FIG. 7B, by multiplying the reference fluctuation amount dQ when the rail pressure is 80 MPa with the reciprocal of the contraction rate or reciprocal of the expansion rate, the fluctuation amount dQ of the main injection at each rail pressure is calculated.

Expressed in general terms, in this embodiment of the present invention, the contraction rate or expansion rate of the fluctuation pattern at each rail pressure is comprised of a first contraction rate or first expansion rate in a direction increasing or decreasing the time interval Ti and a second contraction rate or second expansion rate in a direction increasing or decreasing the fluctuation amount dQ of the injection amount. These second contraction rate and second expansion rate are functions of the rail pressure. When the rail pressure is not the reference rail pressure, the time interval is multiplied with the first contraction rate or first expansion rate to find the modified time interval, and the reference fluctuation amount dQ in accordance with this modified time interval Ti is multiplied with the reciprocal of the second contraction rate or the reciprocal of the second expansion rate and the obtained amount is made the fluctuation amount of the later injection.

Figure 8A:
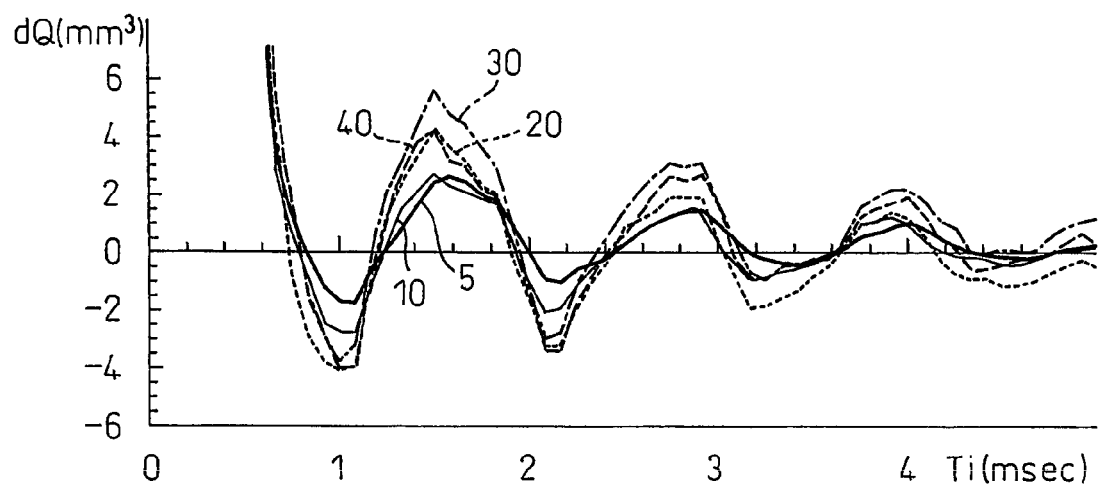
FIGS. 8A and 8B are views of fluctuation amounts of main injection.
Figure 8B:
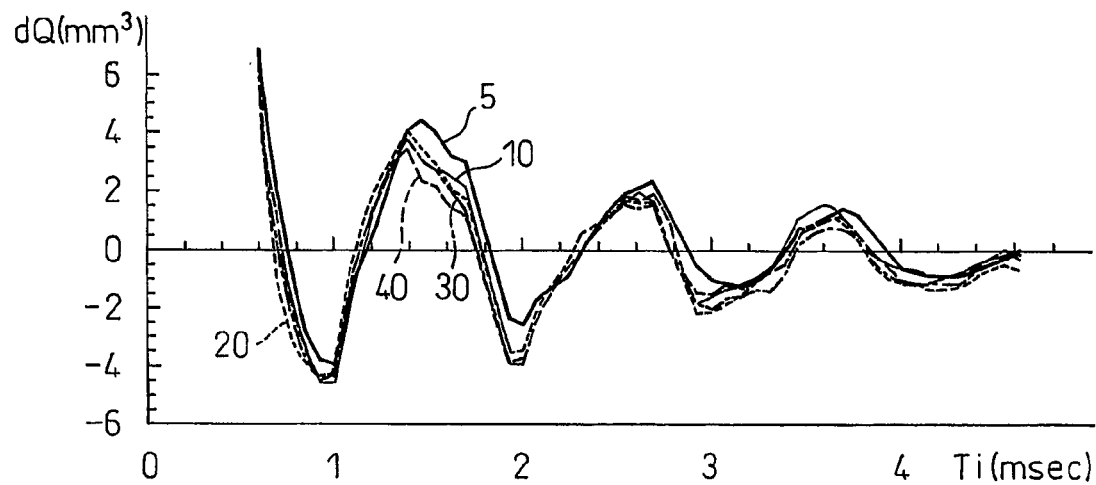

FIG. 8A shows the fluctuation amount dQ of the main injection when making the injection amount of the main injection 5 (mm$^3$), 10 (mm$^3$), 20 (mm$^3$), 30 (mm$^3$), and 40 (mm$^3$) in the state maintaining the rail pressure at 48 MPa. Even when the time interval Ti is the same, if the fluctuation amount of the main injection changes, that is, the injection timing changes, the region of the fluctuation pattern affecting the injection changes, so the fluctuation amount dQ of the main injection changes in accordance with the fluctuation amount of the main injection. In this case, the fluctuation amount dQ of the main injection at the same time interval Ti generally speaking becomes larger the greater the injection amount of the main injection. Therefore, to standardize the fluctuation pattern at each rail pressure to the common reference fluctuation pattern, it is preferable to contract or expand the fluctuation pattern at each rail pressure in the ordinate direction of FIG. 8A, that is, in the direction increasing or decreasing the fluctuation amount dQ of the main injection, in accordance with the rail pressure. FIG. 8B shows the case of contracting or expanding the fluctuation pattern at each rail pressure in the direction increasing or decreasing the fluctuation amount dQ of the main injection to overlay it on the reference fluctuation pattern.

In this case, in this embodiment of the present invention, the contraction rate or expansion rate of the fluctuation pattern when contracting or expanding the fluctuation pattern of the fluctuation amount of the later injection to overlay it on the reference fluctuation pattern is stored for each injection amount of the main injection. In FIG. 8B, by multiplying the reference fluctuation amount dQ when the injection amount is 20 (mm$^3$) with the reciprocal of the contraction rate or reciprocal of the expansion rate, the fluctuation amount dQ of the main injection is calculated.

Expressed in general terms, in this embodiment of the present invention, the contraction rate or expansion rate of the fluctuation pattern at each rail pressure is comprised of a first contraction rate or first expansion rate in a direction increasing or decreasing the time interval Ti and a second contraction rate or second expansion rate in a direction increasing or decreasing the fluctuation amount dQ of the injection amount. These second contraction rate and second expansion rate are functions of the injection amount of the main injection. When the rail pressure is not the reference rail pressure, the time interval is multiplied with the first contraction rate or first expansion rate to find the modified time interval, the reference fluctuation amount dQ in accordance with this modified time interval Ti is multiplied with the reciprocal of the second contraction rate or the reciprocal of the second expansion rate, and the obtained amount is made the fluctuation amount of the later injection.

Further, while not shown, when the pilot injection amount changes, the fluctuation amount dQ of the main injection changes. Therefore, in this case as well, to standardize the fluctuation pattern at each pilot injection amount to the common reference fluctuation pattern, it is preferable to contract or expand the fluctuation pattern at each pilot injection amount in the direction increasing or decreasing the fluctuation amount dQ of the main injection. In this case, expressed in general terms, the contraction rate or expansion rate of the fluctuation pattern at each rail pressure is comprised of a first contraction rate or first expansion rate in a direction increasing or decreasing the time interval Ti and a second contraction rate or second expansion rate in a direction increasing or decreasing the fluctuation amount dQ of the injection amount. These second contraction rate and second expansion rate are functions of the injection amount of the pilot injection amount. When the rail pressure is not the reference rail pressure, the time interval is multiplied with the first contraction rate or first expansion rate to find the modified time interval, the reference fluctuation amount dQ in accordance with this modified time interval Ti is multiplied with the reciprocal of the second contraction rate or the reciprocal of the second expansion rate, and the obtained amount is made the fluctuation amount of the later injection.

Next, an example of the fuel injection control for controlling the fuel injection to a target value will be explained with reference to the fuel injection control routine shown in FIG. 9.

Figure 9:
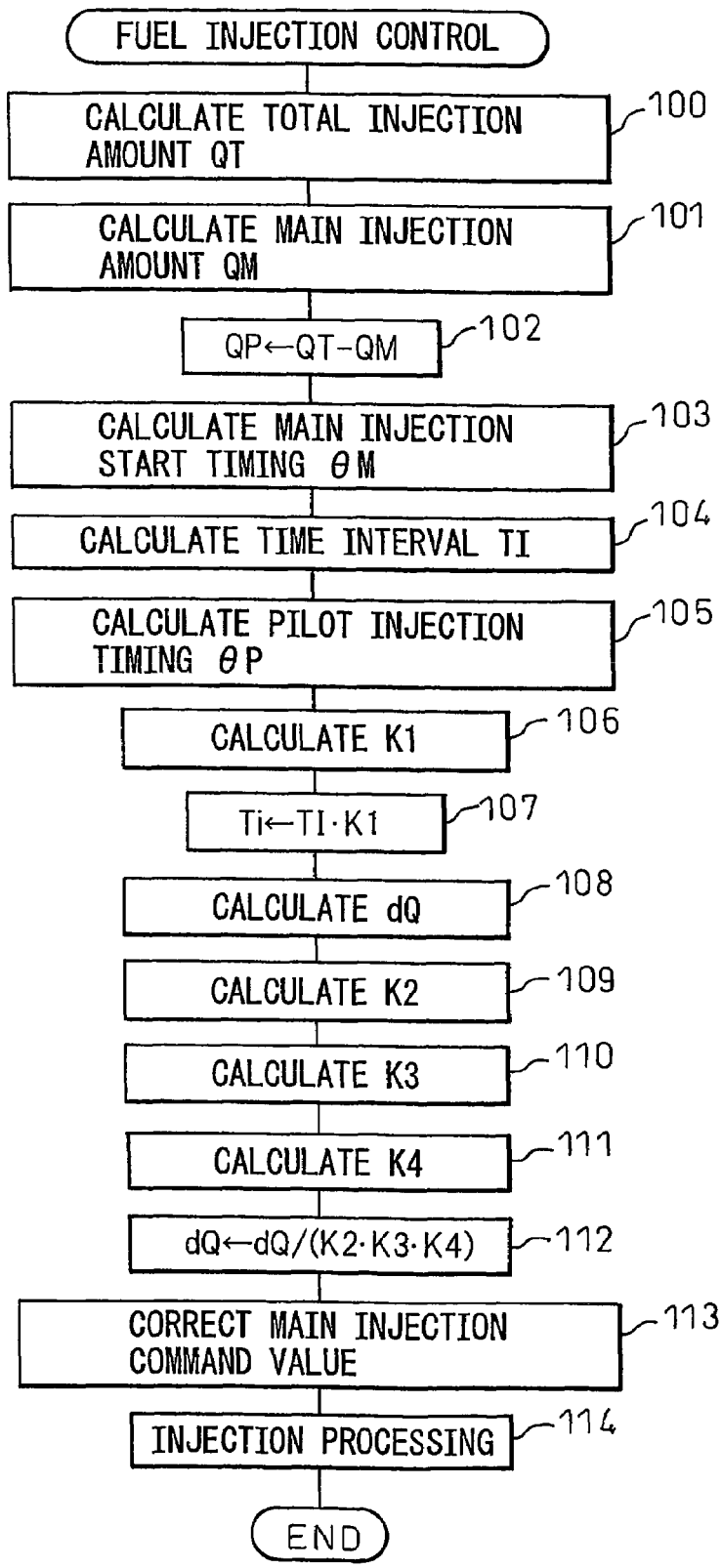
FIG. 9 is a flow chart of fuel injection control.

Referring to FIG. 9, first, at step 100, the total injection amount QT is calculated from the map shown in FIG. 4A. Next, at step 101, the main injection amount QM is calculated from the map shown in FIG. 4B. Next, at step 102, the total injection amount QT is subtracted by the main injection amount QM to calculate the pilot injection amount QP. Next, at step 103, the main injection start timing θM is calculated from the map shown in FIG. 5A. Next, at step 104, the time interval TI is calculated from the map shown in FIG. 5B. Next, at step 105, the pilot injection start timing θP is calculated from the main injection start timing θM and the time interval TI.

Figure 10A:
FIGS. 10A to 10D are views of contraction rates or expansion rates.

Next, at step 106, the contraction rate or expansion rate K1 when contracting or expanding the fluctuation pattern of the fluctuation amount dQ of the main injection amount in a direction increasing or reducing the time interval in accordance with the rail pressure based on the rail pressure detected by the fuel pressure sensor 16 or the mean value of the rail pressure in a fixed time (hereinafter referred to simply as the "rail pressure") to overlay it on the reference fluctuation pattern is calculated. This contraction rate or expansion rate K1 is shown in FIG. 10A. If the reference rail pressure is 80 MPa, when the rail pressure is near 80 MPa, the contraction rate or expansion rate K1 is 1.0. As the rail pressure becomes lower than the reference rail pressure, K1 decreases, that is, the fluctuation pattern contracts, while as the rail pressure becomes higher than the reference rail pressure, K1 increases, that is, the fluctuation pattern is expanded.

Next, at step 107, the contraction rate or expansion rate K1 of the fluctuation pattern is multiplied with the time interval TI so as to calculate the modified time interval Ti. Next, at step 108, if the reference rail pressure is made 80 MPa, the reference main injection amount QM is made 20 (mm$^3$), and the reference pilot injection amount QP is made 2 (mm$^3$), that is, the fluctuation amount shown by the o marks in FIG. 7B is made the reference fluctuation amount dQ, the reference fluctuation amount dQ in accordance with the modified time interval Ti is calculated.

Figure 10B:
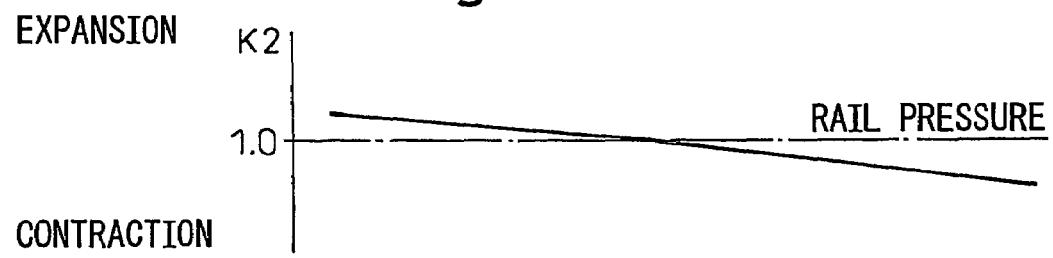

Next, at step 109, the contraction rate or expansion rate K2 of the fluctuation pattern when contracting or expanding the fluctuation pattern of the main injection amount in a direction increasing or reducing the fluctuation amount of the main injection in accordance with the rail pressure to overlay it on the reference fluctuation pattern is calculated. The change of K2 is shown in FIG. 10B. As shown in FIG. 10B, near the rail pressure serving as the reference, the value of K2 becomes 1.0. When the rail pressure becomes lower than the reference rail pressure, the value of K2 becomes larger than 1.0, while when the rail pressure becomes higher than the reference rail pressure, the value of K2 becomes smaller than 1.0.

Figure 10C:
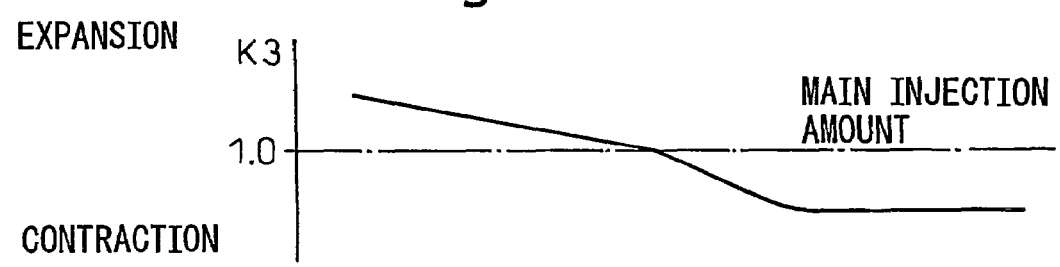

Next, at step 110, the contraction rate or expansion rate K3 of the fluctuation pattern when contracting or expanding the fluctuation pattern of the main injection amount in a direction increasing or reducing the fluctuation amount of the main injection in accordance with the main injection amount QM to overlay it on the reference fluctuation pattern is calculated. This change of K3 is shown in FIG. 10C. As shown in FIG. 10C, near the main injection amount serving as the reference, the value of K3 becomes 1.0. When the main injection amount becomes lower than the reference main injection amount, the value of K3 becomes larger than 1.0, while when the main injection amount becomes higher than the reference main injection amount, the value of K3 becomes smaller than 1.0.

Figure 10D:
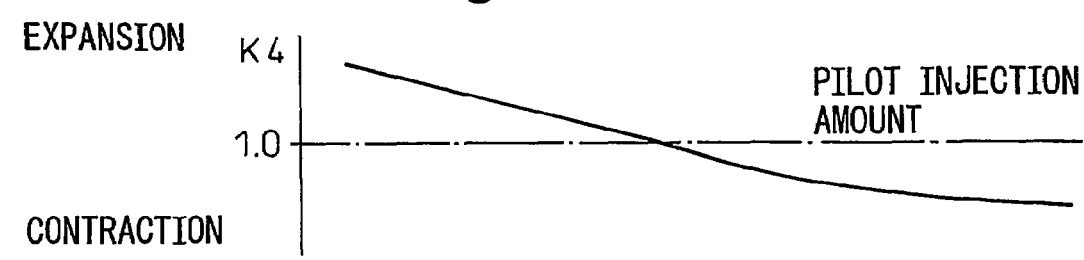

Next, at step 111, the contraction rate or expansion rate K4 of the fluctuation pattern when contracting or expanding the fluctuation pattern of the main injection amount in a direction increasing or reducing the fluctuation amount of the main injection in accordance with the pilot injection amount to overlay it on the reference fluctuation pattern is calculated. This change of K4 is shown in FIG. 10D. As shown in FIG. 10D, near the pilot injection amount serving as the reference, the value of K4 becomes 1.0. When the pilot injection amount becomes lower than the reference pilot injection amount, the value of K4 becomes larger than 1.0, while when the pilot injection amount becomes higher than the reference pilot injection amount, the value of K4 becomes smaller than 1.0.

Next, at step 112, the reference fluctuation amount dQ calculated at step 108 is multiplied with the reciprocal of the contraction rates or expansion rates K2, K3, and K4 to calculate the final fluctuation amount dQ of the main injection. Next, at step 113, a command value of the main injection is corrected so that the actual injection amount becomes the target value based on this fluctuation amount dQ. For example, when the fluctuation amount dQ is plus, the command value of the main injection is corrected so that the main injection amount QM calculated at step 101 is reduced by the fluctuation amount dQ and the actual injection amount becomes the reduced main injection amount (QM−dQ). As opposed to this, if the fluctuation amount dQ is minus, the command value of the main injection is corrected so that the main injection amount QM is increased by the fluctuation amount dQ and the actual injection amount becomes the increased main injection amount (QM+dQ). In this way, the actual injection amount is controlled to the target value QT. Next, at step 114, the processing for injection of the pilot injection and main injection is performed.

Now, as explained above, the main injection amount fluctuates due to the pressure pulsation occurring in the nozzle chamber 34, but this main injection amount also fluctuates due to the fluctuation of the opening timing of the needle valve 31. That is, based on the command for starting the main injection, the overflow control valve 40 opens, the fuel pressure in the pressure control chamber 36 gradually falls, and the needle valve 31 opens when the pressure difference between the needle chamber 34 and the pressure control chamber 36 becomes at least a fixed pressure. In this case, when the fuel pressure in the pressure control chamber 36 gradually falls, if the pressure pulsation causes the fuel pressure in the nozzle chamber 34 to rapidly rise or the fuel pressure in the pressure control chamber 36 to rapidly fall, the pressure difference between the needle chamber 34 and the pressure control chamber 36 will become at least a fixed value. Therefore, the opening timing of the needle valve 31 will be advanced. As opposed to this, when the fuel pressure in the pressure control chamber 36 gradually falls, if the pressure pulsation causes the fuel pressure in the nozzle chamber 34 to rapidly fall or the fuel pressure in the pressure control chamber 36 to rapidly rise, time will be required until the pressure difference between the needle chamber 34 and the pressure control chamber 36 becomes at least a fixed value, so the opening timing of the needle valve 31 is delayed.

In this way, the opening timing of the needle valve 31 fluctuates in accordance with the rate of change of the pressure pulsation, that is, the differentiated value of the change of the pressure pulsation. In this case, if the opening timing of the needle valve 31 is advanced, the main injection amount will increase, while if the opening timing of the needle valve 31 is delayed, the main injection amount will decrease. Therefore, if the opening timing of the needle valve 31 fluctuates due to the effect of the rate of change of the pressure pulsation, the main injection amount will fluctuate along with this.

In this way, the main injection amount fluctuates due to both the fluctuation of the injection amount due to fluctuation of the fuel pressure in the nozzle chamber 34 and fluctuation of the fluctuation amount due to fluctuation in the opening timing of the needle valve 31. However, the injection amount when the needle valve 31 opens is determined by the fuel pressure in the suck chamber 32. As shown in FIG. 7, when the main injection amount is large, the lift of the needle valve 31 becomes large and therefore at this time the fuel pressure in the suck chamber 32 pulsates along with the fuel pressure in the nozzle chamber 34. That is, when the main injection amount is large, if pulsation occurs in the nozzle chamber 34, the main injection amount will fluctuate. That is, the fluctuation amount dQ of the main injection amount shown in FIG. 7 includes both the fluctuation amount of the injection amount due to pulsation in the nozzle chamber 34 and the fluctuation amount of the injection amount due to fluctuation of the opening timing of the needle valve 31.

On the other hand, when the main injection amount is small such as shown in FIG. 6, the lift of the needle valve 31 is small. At this time, the pressure pulsation occurring in the nozzle chamber 32 does not propagate much at all in the suck chamber 32. Therefore, when main injection amount is small, there is not that much fluctuation in the injection amount due to pressure pulsation of the nozzle chamber 34, that is, pressure pulsation in the suck chamber 32. At this time, the fluctuation of the main injection amount due to fluctuation of the opening timing of the needle valve 31 becomes dominant.

However, the fluctuation in the main injection due to pressure pulsation in the nozzle chamber 32 is due to the magnitude of the absolute pressure in the nozzle chamber 32. The fluctuation in the opening timing of the needle valve 31 is not due to the magnitude of the absolute pressure in the nozzle chamber 34, but is due to the rate of change of the fuel pressure in the nozzle chamber 34 or pressure control chamber 36. Therefore, the fluctuation pattern of the fluctuation amount dQ of the main injection amount shown in FIGS. 6A to 6C where the fluctuation of the opening timing of the needle valve 31 dominates the fluctuation of the main injection amount and the fluctuation pattern of the fluctuation amount dQ of the main injection amount shown in FIGS. 7A to 7C where both the effect due to the pressure pulsation in the nozzle chamber 34 and the effect due to the fluctuation of the opening timing of the needle valve 31 appear differ somewhat.

Therefore, when making the fluctuation patterns shown in FIGS. 7A to 7C contract or expand, these fluctuation patterns will generally overlay the fluctuation patterns shown in FIGS. 6A to 6C, but will not accurately overlay them. Therefore, to make the injection amount match the target value more accurately, it is preferable to provide two maps, that is, the map of the fluctuation amount dQ of the main injection standardized as shown in FIG. 6C for when the fuel injection amount is small and the map of the fluctuation amount dQ of the main injection standardized as shown in FIG. 7C for when the fuel injection amount is large, and, when finding the fluctuation amount dQ of the main injection, to selectively use one of these two maps in accordance with the fuel injection amount.

On the other hand, when the prior injection is pilot injection with a small injection amount, the fluctuation amount dQ of the main injection fluctuates by a fluctuation pattern as shown in FIG. 6A to FIG. 8B, but when the injection amount of the prior injection is large as shown by M of FIG. 3B, the fluctuation amount dQ of the later injection will fluctuate by a considerably different fluctuation pattern from the fluctuation pattern shown in FIG. 6A to FIG. 8C. Therefore, when there are cases where the injection amounts of the prior injection are small and large as shown in FIG. 3B, it is preferable to provide four maps, that is, the map of the fluctuation amount dQ of the later injection standardized for when the injection amount of the prior injection is small and the injection amount of the later injection is small, the map of the fluctuation amount dQ of the later injection standardized for when the injection amount of the prior injection is small and the injection amount of the later injection is large, the map of the fluctuation amount dQ of the later injection standardized for when the injection amount of the prior injection is large and the injection amount of the later injection is small, and the map of the fluctuation amount dQ of the later injection standardized for when the injection amount of the prior injection is large and the injection amount of the later injection is large, and, when finding the fluctuation amount dQ of the later injection, to selectively use one of these four maps in accordance with the injection amount of the prior injection and the injection amount of the later injection.

Next, an embodiment separately finding the fluctuation in the opening timing of the needle valve 31 and the fluctuation in the injection amount of the main injection due to the fluctuation of the injection pressure and controlling the injection amount to the target value based on these fluctuations will be explained.

As explained above, the fluctuation pattern of the fluctuation amount dQ of the main injection amount shown in FIGS. 6A to 6C where the fluctuation of the opening timing of the needle valve 31 dominates the fluctuation of the main injection amount and the fluctuation pattern of the fluctuation amount dQ of the main injection amount shown in FIGS. 7A to 7C where both the effect due to the pressure pulsation in the nozzle chamber 34 and the effect due to the fluctuation of the opening timing of the needle valve 31 appear differ somewhat. Therefore, when making the fluctuation patterns shown in FIGS. 7A to 7C contract or expand, these fluctuation patterns will generally overlay the fluctuation patterns shown in FIGS. 6A to 6C, but will not accurately overlay them.

However, when taking out only the fluctuation of the opening timing of the needle valve 31, by making the fluctuation patterns at the different rail pressures contract or expand, it is possible to overlay the fluctuation patterns on a fluctuation pattern serving as a single reference. If taking out only the fluctuation of the main injection amount minus the fluctuation of the main injection amount due to fluctuation of the opening timing of the needle valve 31, in this case as well, by making the fluctuation patterns at the different rail pressures contract or expand, it is possible to overlay the fluctuation patterns on a fluctuation pattern serving as a single reference. Therefore, it is possible to make the injection amount accurately match with the target value.

Next, this will be explained while referring to FIGS. 11A to 11C and FIGS. 12A to 12C.

Figure 11C:
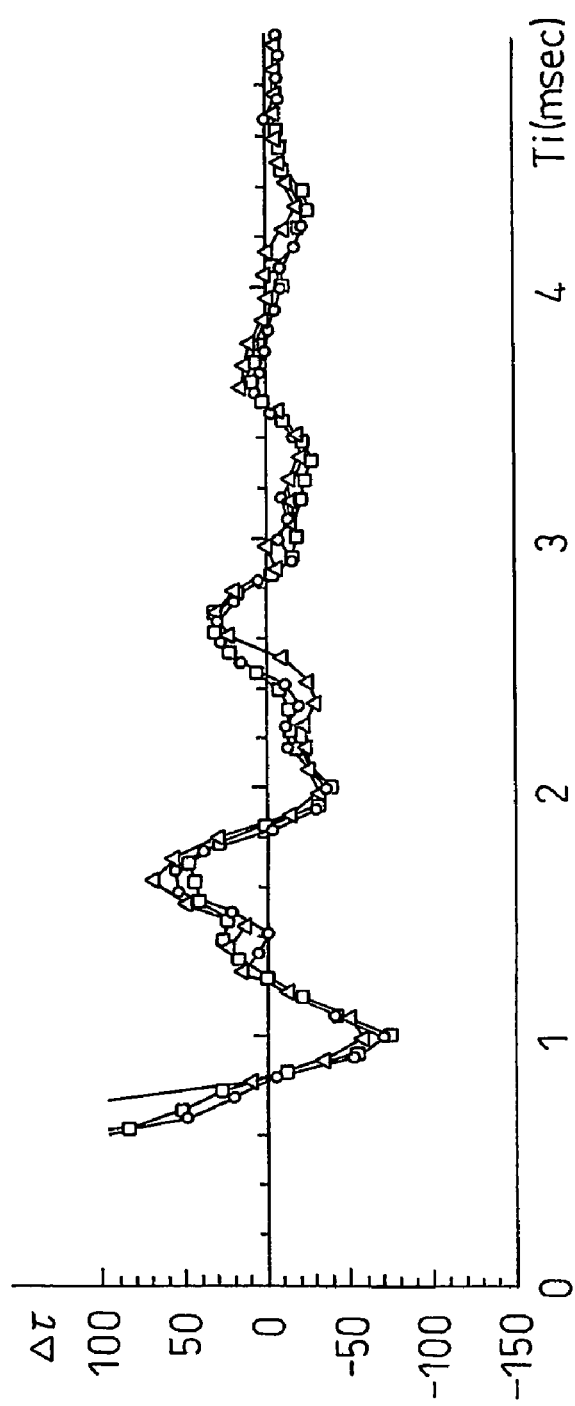

FIGS. 11A to 11C show the relationship between the time interval Ti (msec) and the fluctuation amount $\Delta\tau$ ($\mu$sec) of the opening timing of the needle valve 31. Further, FIGS. 11A to 11C show the case where the pilot injection amount is 2 (mm$^3$). The □ marks show when the rail pressure is 48 MPa, the o marks show when the rail pressure is 80 MPa, and the Δ marks show when the rail pressure is 128 MPa.

FIG. 11A shows the actual value of the fluctuation amount $\Delta\tau$ of the opening timing of the needle valve 31 at each rail pressure. FIG. 11B shows the case when making the rail pressure 80 MPa the reference rail pressure, making the fluctuation pattern of the opening timing of the needle valve 31 at this time the reference fluctuation pattern, and contracting or expanding the fluctuation pattern when the rail pressure is 48 MPa and 128 MPa shown in FIG. 11A in the time interval axis direction so that the period of upward and downward fluctuation of the fluctuation patterns match the period of upward and downward fluctuation of the reference fluctuation pattern.

On the other hand, FIG. 11C shows the case when contracting or expanding the fluctuation patterns when the rail pressure is 48 MPa and 128 MPa shown in FIG. 11B in the vertical direction, that is, the direction increasing or decreasing the fluctuation amount $\Delta\tau$ of the opening timing of the needle valve 31, so that these fluctuation patterns overlay the reference fluctuation pattern. If taking out the fluctuation amount $\Delta\tau$ of the opening timing of the needle valve 31 in this way, it is learned that it is possible to standardize the fluctuation pattern as shown in FIG. 11C.

Note that the fluctuation amount $\Delta Qm$ of the main injection when the opening timing of the needle valve 31 fluctuates by a unit time becomes greater the higher the rail pressure. The fluctuation amount $\Delta Qm$ of the main injection is found in advance by experiments. Therefore, when the opening timing of the needle valve 31 fluctuates by the $\Delta\tau$ time, by multiplying $\Delta Qm$ with $\Delta\tau$, it is possible to find the fluctuation amount dQm of the main injection (=$\Delta Qm \cdot \Delta\tau$).

FIGS. 12A and 12B show the relationship between the time interval Ti and the fluctuation amount dQt (mm$^3$) of the main injection due to the effects of only the fluctuation of the injection pressure obtained by subtracting from the actual fluctuation amount dQ (mm$^3$) of the main injection the fluctuation amount dQm of the main injection due to fluctuation of the opening timing of the needle valve 31. Further, FIGS. 12A and 12B show the case where the pilot injection amount is 2 (mm$^3$) and the rail pressure is the reference rail pressure 80 MPa. The + marks show when the main injection amount is 5 (mm$^3$), the ◇ marks show when the main injection amount is 10 (mm$^3$), the Δ marks show when the main injection amount is 20 (mm$^3$), o marks show when the main injection amount is 30 (mm$^3$), and the □ marks show when the main injection amount is 40 (mm$^3$).

FIG. 12A shows the fluctuation amount dQt of the main injection at each main injection amount when the rail pressure is the reference rail pressure 80 MPa. FIG. 12B shows the case of making the fluctuation pattern when the rail pressure is the standard rail pressure 80 MPa and the main injection amount is 20 (mm$^3$) the reference fluctuation pattern and contracting or expanding the fluctuation patterns at the time of the main injection amounts of 5 (mm$^3$), 10 (mm$^3$), 30 (mm$^3$), and 40 (mm$^3$) in the vertical direction, that is, the direction increasing or decreasing the fluctuation amount dQt of the main injection, so that the fluctuation patterns overlay the reference fluctuation pattern. If taking out the fluctuation amount dQt of the main injection due to just fluctuation of the injection pressure, it is possible to standardize the fluctuation pattern as shown in FIG. 12B.

Note that in FIG. 12A, when the main injection amount is small such as 5 (mm$^3$) (+ marks) or 10 (mm$^3$) (◇ marks), the lift of the needle valve 31 is small, so the fuel pressure in the suck chamber 32 will not fluctuate that much and therefore the fluctuation amount dQt of the main injection will be small. Even when the fluctuation amount dQt of the main injection is small in this way, if the fluctuation pattern is expanded in the vertical direction, it will overlay the reference fluctuation pattern.

In this embodiment, there are two fuel injection control methods. The first fuel injection control method is the method of finding the fluctuation amount $\Delta\tau$ of the opening timing of the needle valve 31 from FIG. 11C, controlling the opening timing of the needle valve 31 to the target value by this fluctuation amount $\Delta\tau$, finding the fluctuation amount dQt of the main injection from FIG. 12B, and controlling the injection amount of the main injection to the target value by this fluctuation amount dQt, while the second fuel injection control method is the method of finding the fluctuation amount $\Delta\tau$ of the opening timing of the needle valve 31 from FIG. 11C, finding the fluctuation amount dQm (=$\Delta Qm \cdot \Delta\tau$) of the main injection due to the fluctuation in the opening timing of the needle valve 31 from this fluctuation amount $\Delta\tau$, finding the fluctuation amount dQt of the main injection from FIG. 12B, and controlling the fluctuation amount of the main injection to the target value by this fluctuation amount dQt and the fluctuation amount dQm of the main injection due to fluctuation of the opening timing of the needle valve 31.

Figure 13:
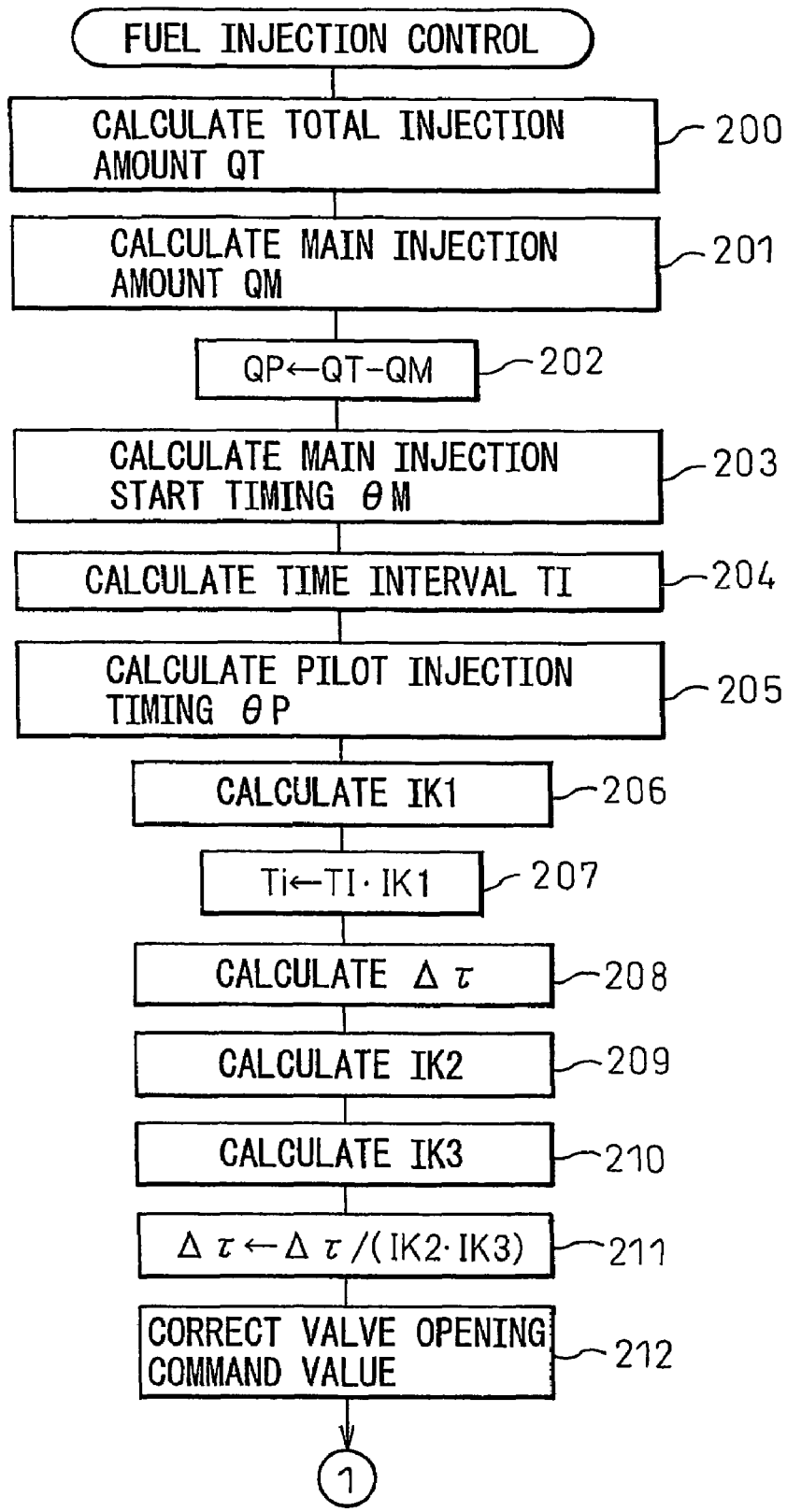
FIGS. 13 and 14 are flow charts of fuel injection control.
Figure 14:
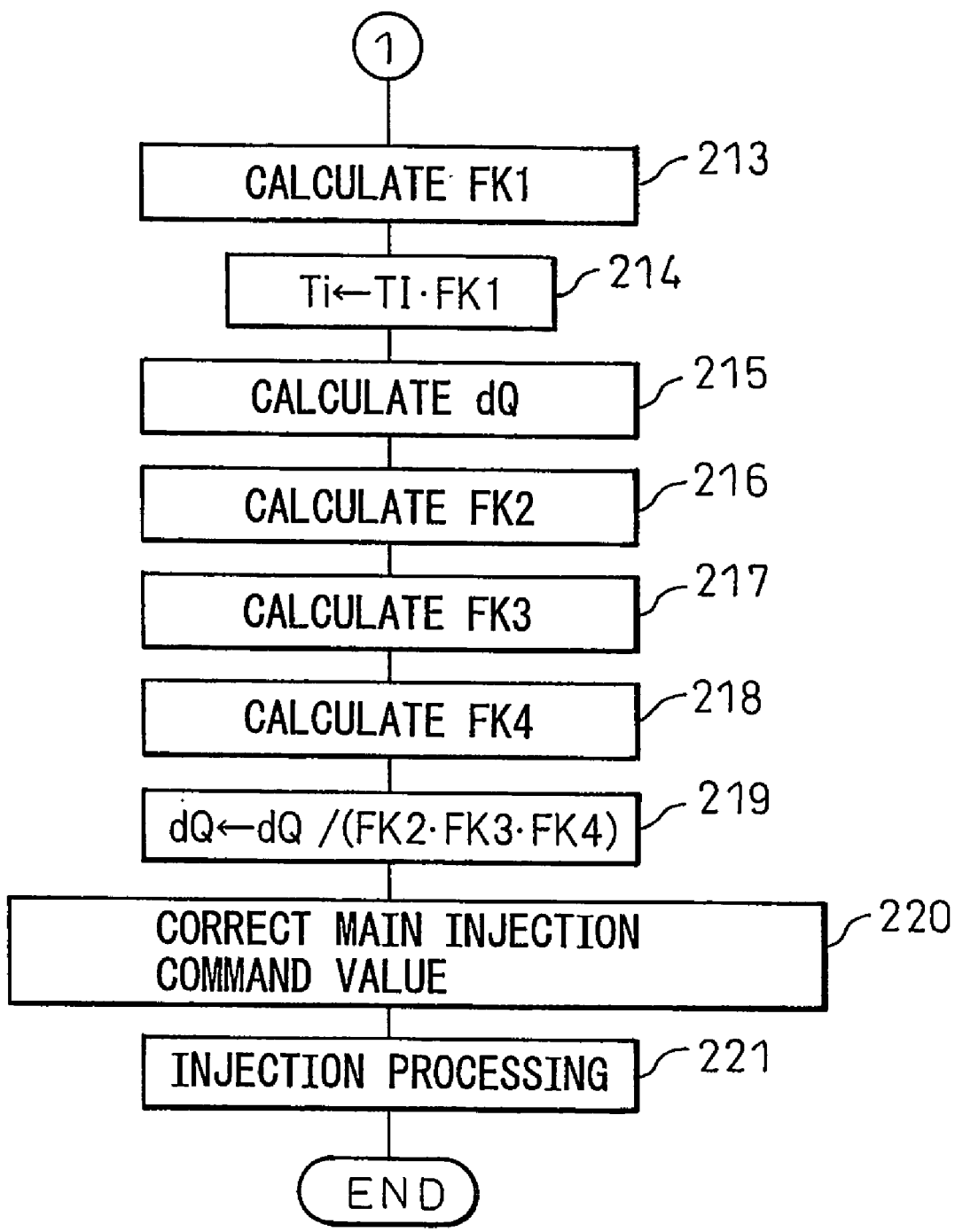

FIG. 13 and FIG. 14 shows a fuel injection control routine for executing the first fuel injection control method.

Referring to FIG. 13 and FIG. 14, first, at step 200, the total injection amount QT is calculated from the map shown in FIG. 4A. Next, at step 201, the main injection amount QM is calculated from the map shown in FIG. 4B. Next, at step 202, the total injection amount QT is subtracted by the main injection amount QM to calculate-the pilot injection amount QP. Next, at step 203, the main injection start timing θM is calculated from the map shown in FIG. 5A. Next, at step 204, the time interval TI is calculated from the map shown in FIG. 5B. Next, at step 205, the pilot injection start timing θP is calculated from the main injection start timing θM and the time interval TI.

Figure 15A:
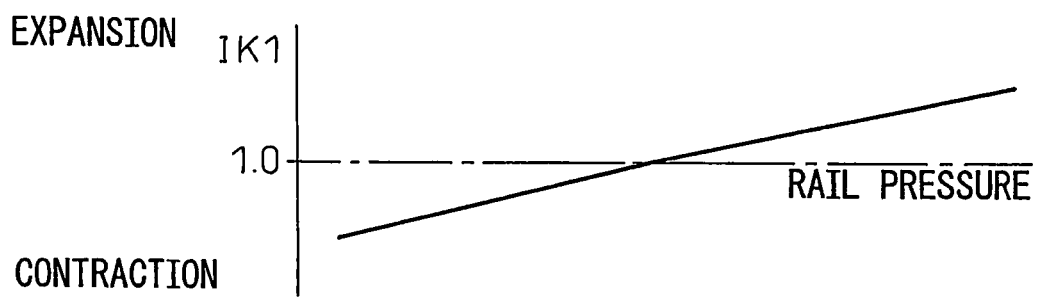
FIGS. 15A to 15C are views of contraction rates or expansion rates.

Next, at step 206, the contraction rate or expansion rate IK1 when contracting or expanding the fluctuation pattern of the fluctuation amount Δτ of the opening timing of the needle valve 21 in a direction increasing or reducing the time interval in accordance with the rail pressure to overlay it on the reference fluctuation pattern is calculated. This contraction rate or expansion rate IK1 is shown in FIG. 15A. If the reference rail pressure is 80 MPa, when the rail pressure is near 80 MPa, the contraction rate or expansion rate IK1 is 1.0. As the rail pressure becomes lower than the reference rail pressure, IK1 decreases, that is, the fluctuation pattern contracts, while as the rail pressure becomes higher than the reference rail pressure, IK1 increases, that is, the fluctuation pattern is expanded.

Next, at step 207, the contraction rate or expansion rate IK1 of the fluctuation pattern is multiplied with the time interval TI so as to calculate the modified time interval Ti. Next, at step 208, if the reference rail pressure is made 80 MPa and the reference pilot injection amount QP is made 20 (mm$^3$), that is, if the fluctuation amount Δt of the opening timing shown by the o marks in FIG. 11B is made the reference fluctuation amount, the reference fluctuation amount of the opening timing in accordance with the modified time interval Ti is calculated.

Figure 15B:
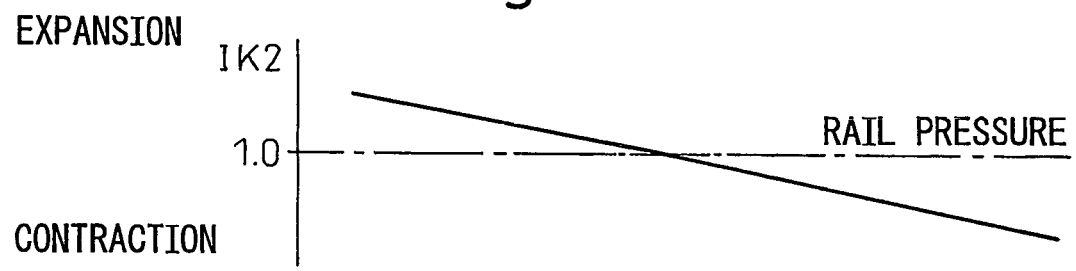

Next, at step 209, the contraction rate or expansion rate IK2 of the fluctuation pattern when contracting or expanding the fluctuation pattern of the opening timing in a direction increasing or reducing the fluctuation amount of the opening timing in accordance with the rail pressure to overlay it on the reference fluctuation pattern is calculated. The change of IK2 is shown in FIG. 15B. As shown in FIG. 15B, near the rail pressure serving as the reference, the value of IK2 becomes 1.0. When the rail pressure becomes lower than the reference rail pressure, the value of IK2 becomes larger than 1.0, while when the rail pressure becomes higher than the reference rail pressure, the value of IK2 becomes smaller than 1.0.

Figure 15C:
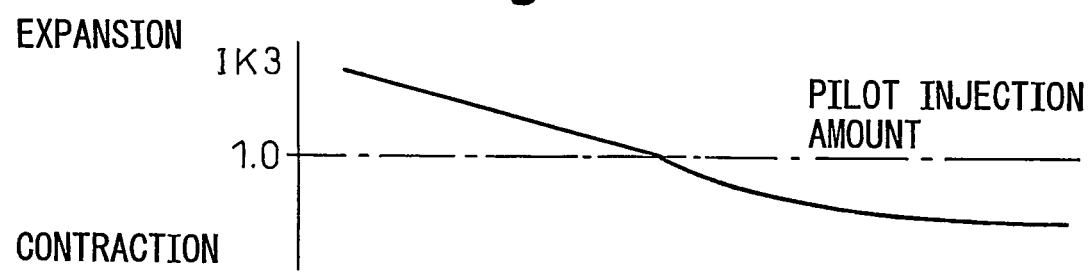

Next, at step 210, the contraction rate or expansion rate IK3 of the fluctuation pattern when contracting or expanding the fluctuation pattern of the opening timing in a direction increasing or reducing the fluctuation amount of the opening timing in accordance with the pilot injection amount to overlay it on the reference pattern is calculated. This change of IK3 is shown in FIG. 15C. As shown in FIG. 15C, near the pilot injection amount serving as the reference, the value of IK3 becomes 1.0. When the pilot injection amount becomes lower than the reference pilot injection amount, the value of IK3 becomes larger than 1.0, while when the pilot injection amount becomes higher than the reference pilot injection amount, the value of IK3 becomes smaller than 1.0.

Next, at step 211, the reference fluctuation amount Δτ of the opening timing calculated at step 208 is multiplied with the reciprocal of the contraction rates or expansion rates IK2 and IK3 to calculate the final fluctuation amount Δτ of the opening timing. Next, at step 212, a command value of the opening timing is corrected so that the actual opening timing becomes the target value based on this fluctuation amount Δτ. For example, when the opening timing is plus, the command value of the main injection is corrected so that the main injection start timing θM calculated at step 203 is delayed by exactly the fluctuation amount Δτ. On the other hand, if the opening timing is minus, the command value of the opening timing is corrected so that the main injection start timing θM calculated at step 203 is advanced by exactly the fluctuation amount Δτ. In this way, the actual opening timing of the needle valve 31 at the time of start of the main injection is controlled to the target value θM.

Figure 16A:
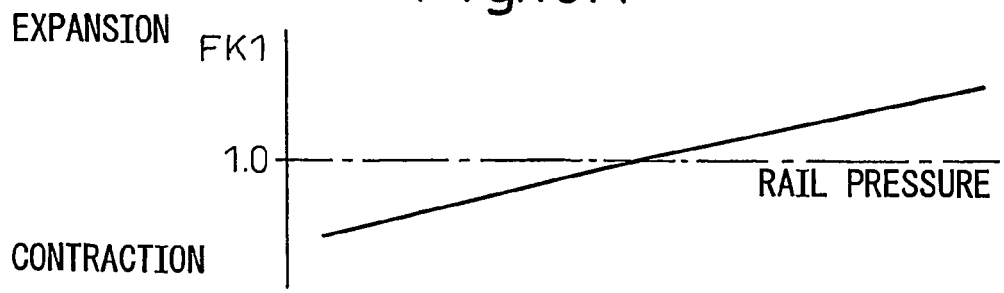
FIGS. 16A to 16D are views of contraction rates or expansion rates.

Next, at step 213, the contraction rate or expansion rate FK1 when contracting or expanding the fluctuation pattern of the fluctuation amount dQ of the main injection in a direction increasing or reducing the time interval in accordance with the rail pressure to overlay it on the reference fluctuation pattern is calculated. This contraction rate or expansion rate FK1 is shown in FIG. 16A. If the reference rail pressure is 80 MPa, when the rail pressure is near 80 MPa, the contraction rate or expansion rate FK1 is 1.0. When the rail pressure becomes lower than the reference rail pressure, FK1 decreases, that is, the fluctuation pattern is contracted, while when the rail pressure becomes higher than the reference rail pressure, FK1 increases, that is, the fluctuation pattern is expanded.

Next, at step 214, the contraction rate or expansion rate FK1 of the fluctuation pattern is multiplied with the time interval TI to calculate the modified time interval Ti. Next, at step 215, when the reference rail pressure is made 80 MPa, the main injection amount QM serving as a reference is made 20 (mm$^3$), and the pilot injection amount QP serving as a reference is made 2 (mm$^3$), that is, when the fluctuation amount shown by the A marks in FIG. 12B is made the reference fluctuation amount dQ, the reference fluctuation amount dQ corresponding to the modified time interval Ti is calculated.

Figure 16B:
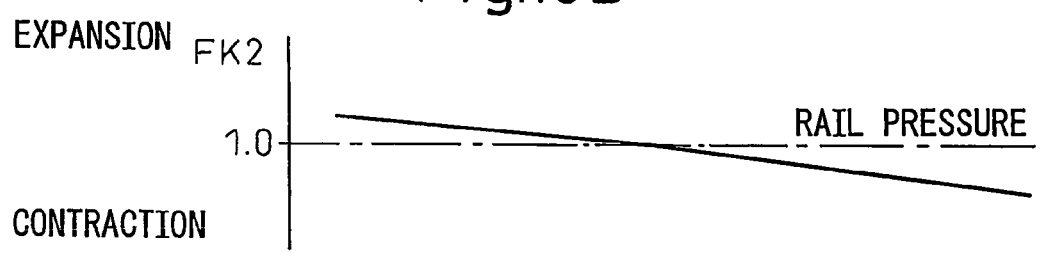

Next, at step 216, the contraction rate or expansion rate FK2 of the fluctuation pattern when contracting or expanding the fluctuation pattern of the main injection amount in a direction increasing or reducing the fluctuation amount of the main injection in accordance with the rail pressure to overlay it on the reference fluctuation pattern is calculated. This change of FK2 is shown in FIG. 16B. As shown in FIG. 16B, near the rail pressure serving as the reference, the value of FK2 becomes 1.0. When the rail pressure becomes lower than the reference rail pressure, the value of FK2 becomes larger than 1.0, while when the rail pressure becomes higher than the reference rail pressure, the value of FK2 becomes smaller than 1.0.

Figure 16C:
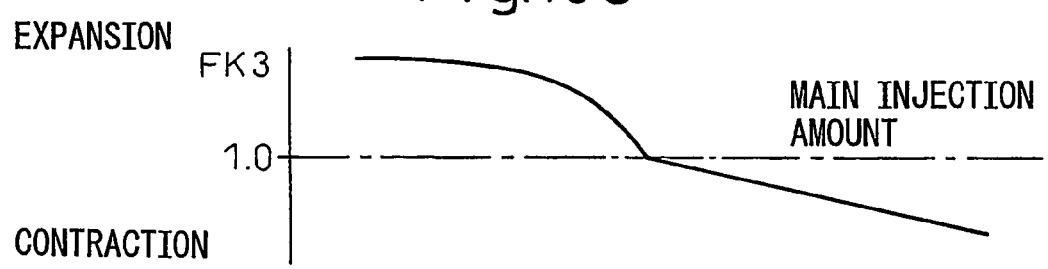

Next, at step 217, the contraction rate or expansion rate FK3 of the fluctuation pattern when contracting or expanding the fluctuation pattern of the main injection amount in a direction increasing or reducing the fluctuation amount of the main injection in accordance with the main injection amount QM to overlay it on the reference fluctuation pattern is calculated. This change of FK3 is shown in FIG. 16C. As shown in FIG. 16C, near the main injection amount serving as the reference, the value of FK3 becomes 1.0. When the main injection amount becomes lower than the reference main injection amount, the value of FK3 becomes larger than 1.0, while when the main injection amount becomes higher than the reference main injection amount, the value of FK3 becomes smaller than 1.0.

Figure 16D:
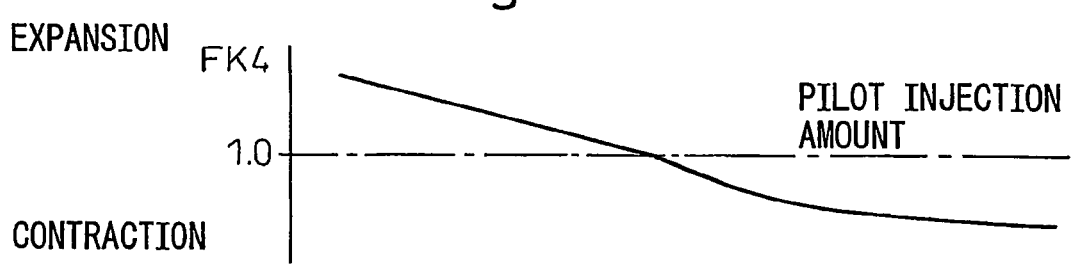

Next, at step 218, the contraction rate or expansion rate FK4 of the fluctuation pattern when contracting or expanding the fluctuation pattern of the main injection amount in a direction increasing or reducing the fluctuation amount of the main injection in accordance with the pilot injection amount to overlay it on the reference fluctuation pattern is calculated. This change of FK4 is shown in FIG. 16D. As shown in FIG. 16D, near the pilot injection amount serving as the reference, the value of FK4 becomes 1.0. When the pilot injection amount becomes lower than the reference pilot injection amount, the value of FK4 becomes larger than 1.0, while when the pilot injection amount becomes higher than the reference pilot injection amount, the value of FK4 becomes smaller than 1.0.

Next, at step 219, the reference fluctuation amount dQ calculated at step 215 is multiplied with the reciprocal of the contraction rates or expansion rates FK2, FK3, and FK4 to calculate the final fluctuation amount At of the main injection. Next, at step 220, a command value of the main injection is corrected so that the actual injection amount becomes the target value based on this fluctuation amount dQ. For example, when the fluctuation amount dQ is plus, the command value of the main injection is corrected so that the main injection amount QM calculated at step 201 is reduced by the fluctuation amount dQ and the actual injection amount becomes the reduced main injection amount (QM−dQ). As opposed to this, if the fluctuation amount dQ is minus, the command value of the main injection is corrected so that the main injection amount QM is increased by the fluctuation amount dQ and the actual injection amount becomes the increased main injection amount (QM+dQ). In this way, the actual injection amount is controlled to the target value QT. Next, at step 221, the processing for injection of the pilot injection and main injection is performed.

Figure 17:
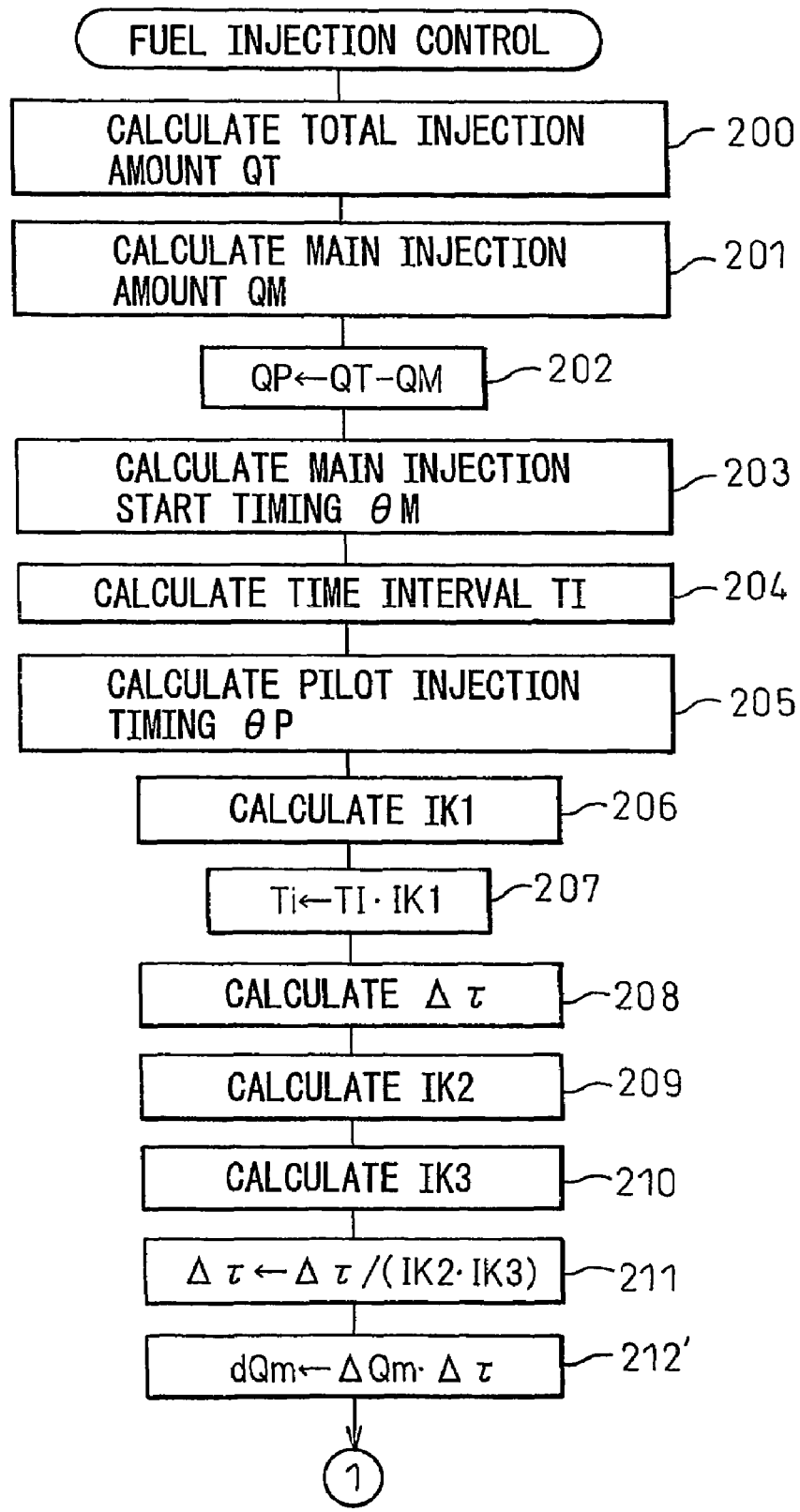
FIGS. 17 and 18 are flow charts of fuel injection control.
Figure 18:
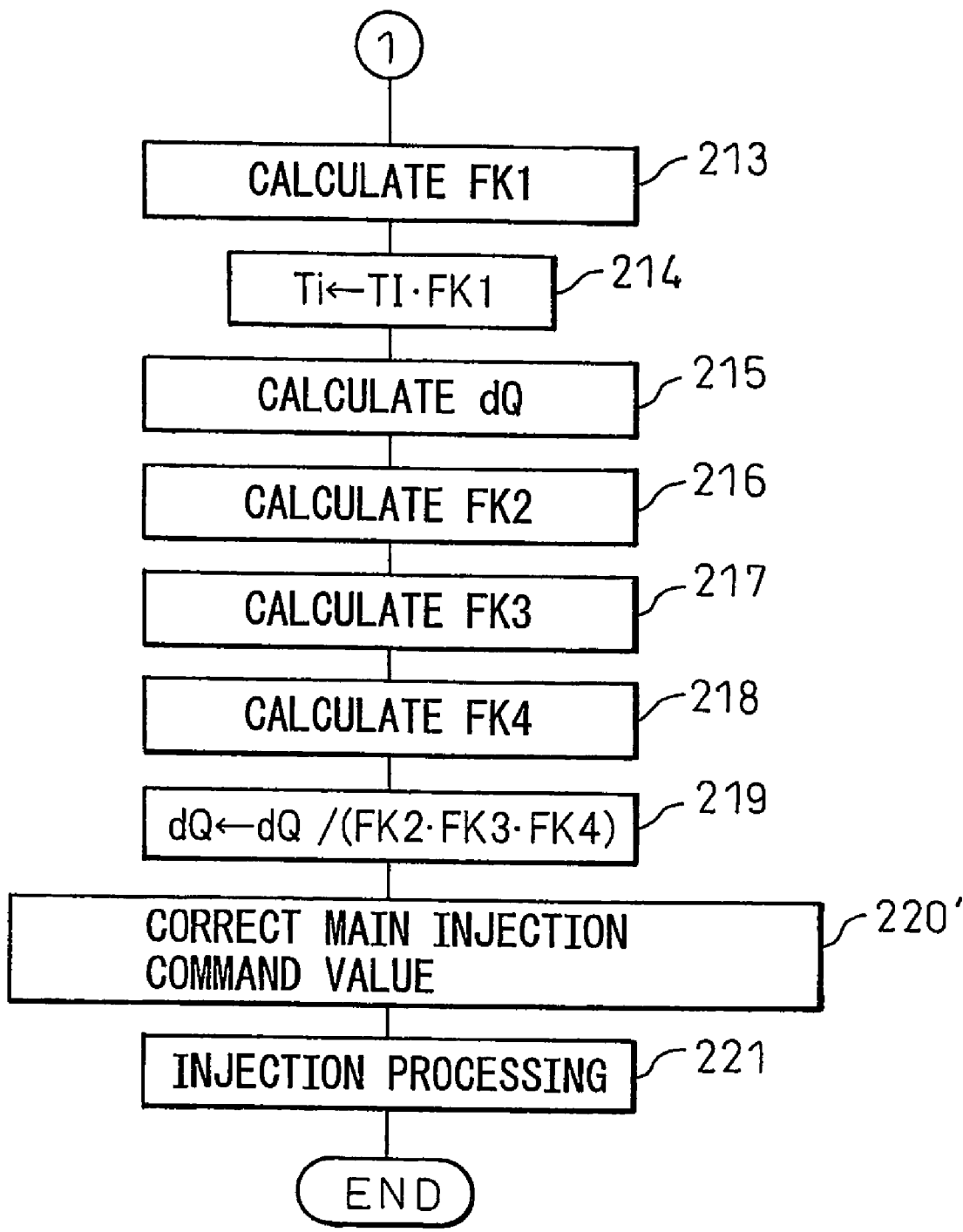

FIG. 17 and FIG. 18 show a fuel injection control routine for executing the second fuel injection control method.

In this routine, the only difference from the routine shown in FIG. 13 and FIG. 14 is step 212' and 220'. The rest of the steps 200 to 211, 213 to 219, and 221 are the same as steps 200 to 211, 213 to 219, and 221 in FIG. 13 and FIG. 14. Therefore, below, only steps 212' and 220' in the routine shown in FIG. 17 and FIG. 18 will be explained.

As explained above, the fluctuation amount ΔQm for when the opening timing of the needle valve 31 fluctuates by a unit time is found in advance by experiments. At step 212', this ΔQm is multiplied with the fluctuation amount Δτ of the opening timing found at step 211 so as to calculate the fluctuation amount dQm of the main injection (=Δθm·Δτ). Next, at step 220', the main injection command value is corrected based on the fluctuation amount dQm of the main injection and the fluctuation amount dQ of the main injection found at step 219.

In this case, there are various methods for correction of the main injection command value. The main injection command value is corrected by any of these methods. The simplest method is to add to the main injection amount QM calculated at step 201 the fluctuation amounts dQ and dQm and make the added up main injection amount (QM+dQ+dQm) the final main injection amount. The injection start timing is left as it is, while the injection end timing is determined so that the actual main injection amount becomes the final main injection amount (QM+dQ+dQm).

Further, it is possible to convert the fluctuation amount dQ to the injection timing Δt and convert the fluctuation amount dQm to the injection time Δtm and to extend or shorten the injection time by exactly the sum of these calculated fluctuation amounts (Δt+Δtm). Alternatively, it is possible to advance or delay the injection start timing by exactly the fluctuation amount Δtm and advance or delay the injection end timing by exactly the fluctuation amount Δt.

The invention claimed is:

1. A fuel injection system of an internal combustion engine provided with a common rail and fuel injectors connected to the common rail, performing fuel injection from each fuel injector at least the two times of prior injection and later injection during one cycle of the engine, and changing in fluctuation amount of the later injection with respect to a target value depending on a time interval from when the prior injection is performed to when the later injection is performed, said fuel injection system of an internal combustion engine provided with a storage device for storing a reference fluctuation amount of the later injection changing along with a reference fluctuation pattern along with an increase in said time interval when the rail pressure is a predetermined reference rail pressure and storing a contraction rate or expansion rate of the fluctuation pattern when contracting or expanding the fluctuation pattern of said fluctuation amount of the later injection when the rail pressure is not the reference rail pressure to overlay it on the reference fluctuation pattern, a calculation device for using said contraction rate or expansion rate to calculate said fluctuation amount of the later injection in accordance with the rail pressure from said reference fluctuation amount and time interval, and a control device for using the fluctuation amount calculated by said calculation device to control an injection amount to a target value.

2. A fuel injection system of an internal combustion engine as set forth in claim 1, wherein when the rail pressure is not the reference rail pressure, said calculation device multiples the time interval with the contraction rate or expansion rate to find a modified time interval and makes the reference fluctuation amount in accordance with said modified time interval said fluctuation amount of the later injection.

3. A fuel injection system of an internal combustion engine as set forth in claim 1, wherein said the contraction rate or expansion rate of the fluctuation pattern at each rail pressure stored in said storage device is comprised of a first contraction rate or first expansion rate in a direction increasing or decreasing the time interval and a second contraction rate or second expansion rate in a direction increasing or decreasing the fluctuation amount of the injection amount and, when the rail pressure is not the reference rail pressure, the time interval is multiplied with the first contraction rate or first expansion rate to find a modified time interval, the reference fluctuation amount in accordance with this modified time interval is multiplied with the reciprocal of the second contraction rate or the reciprocal of the second expansion rate, and the obtained amount is made the fluctuation amount of the later injection.

4. A fuel injection system of an internal combustion engine as set forth in claim 3, wherein said second contraction rate and second expansion rate are functions of the rail pressure.

5. A fuel injection system of an internal combustion engine as set forth in claim 3, wherein said second contraction rate and second expansion rate are functions of the injection amount of the later injection.

6. A fuel injection system of an internal combustion engine as set forth in claim 3, wherein said second contraction rate and second expansion rate are functions of the injection amount of the prior injection.

7. A fuel injection system of an internal combustion engine as set forth in claim 1, wherein the reference fluctuation amount of the later injection stored in said storage device is comprised of a plurality of sets of reference fluctuation amounts, and the injection amount is controlled to a target value by selectively using one set of the reference fluctuation amounts from the plurality of sets of reference fluctuation amounts in accordance with the injection amount of the prior injection or the injection amount of the later injection.

8. A fuel injection system of an internal combustion engine as set forth in claim 1, wherein the reference fluctuation amount of the later injection stored in said storage device is comprised of a reference fluctuation amount of an opening timing of the fuel injector when the later injection is to be performed and a reference fluctuation amount of an injection amount at the later injection excluding the injection amount due to the opening timing of the fuel injector, and the injection amount is controlled to a target value based on these reference fluctuation amounts.

9. A fuel injection system of an internal combustion engine as set forth in claim 8, wherein the opening timing of the fuel injector is controlled to a target value based on the reference fluctuation amount of the opening timing of said fuel injector and the injection timing is controlled so that the injection amount becomes a target value based on the reference fluctuation amount of said injection amount.

10. A fuel injection system of an internal combustion engine as set forth in claim 8, wherein said the fluctuation amount of the later injection based on the fluctuation of the opening timing of the fuel injector is found based on the reference fluctuation amount of the opening timing of the fuel injector, and the injection timing is controlled so that the injection amount becomes the target value based on the reference fluctuation amount of said injection amount and the fluctuation amount of the injection based on fluctuation of said opening timing.

* * * * *